(12) United States Patent
Gartner

(10) Patent No.: US 9,494,209 B1
(45) Date of Patent: Nov. 15, 2016

(54) REGRESSIVE HYDRAULIC DAMPER

(76) Inventor: Bill J. Gartner, Wyomissing, PA (US)

(*) Notice: Subject to any disclaimer, the term of this patent is extended or adjusted under 35 U.S.C. 154(b) by 1144 days.

(21) Appl. No.: 12/144,530

(22) Filed: Jun. 23, 2008

Related U.S. Application Data

(60) Provisional application No. 60/945,365, filed on Jun. 21, 2007.

(51) Int. Cl.
| | |
|---|---|
| *F16F 9/34* | (2006.01) |
| *F16F 9/48* | (2006.01) |
| *F16F 7/10* | (2006.01) |
| *F16F 9/516* | (2006.01) |
| *F16F 9/32* | (2006.01) |

(52) U.S. Cl.
CPC .............. *F16F 9/3405* (2013.01); *F16F 9/48* (2013.01); *F16F 9/3214* (2013.01); *F16F 9/516* (2013.01)

(58) Field of Classification Search
CPC .................. F16F 7/00; F16F 9/00; F16F 9/10; F16F 9/14; F16F 9/16; F16F 9/18; F16F 9/182; F16F 9/3207; F16F 9/3214; F16F 9/3221; F16F 9/3228; F16F 9/34; F16F 9/3405; F16F 9/48; F16F 9/50; F16F 9/516; F16F 15/023; F16F 2222/12
USPC ................ 188/282.1, 284, 313, 316, 322.15, 188/322.18, 317, 322.13
See application file for complete search history.

(56) References Cited

U.S. PATENT DOCUMENTS

| | | |
|---|---|---|
| 846,943 A | 3/1907 | Phipps |
| 1,164,371 A | 12/1915 | Lovejoy |
| 2,458,157 A | 1/1949 | Funkhouser |
| 2,719,612 A | 10/1955 | Bourcier De Carbon De Previnquieres |
| 2,800,981 A | 7/1957 | Allinquant |
| 3,066,767 A | 12/1962 | Djordjevitch |
| 3,299,990 A | 1/1967 | Ratcliffe |
| 3,419,113 A | 12/1968 | Shelley |
| 3,760,590 A * | 9/1973 | Bader .............................. 60/764 |
| 4,099,602 A * | 7/1978 | Kourbetsos ................... 188/300 |
| 4,126,302 A | 11/1978 | Curnutt |
| 4,407,396 A | 10/1983 | Sirven |
| 4,749,068 A | 6/1988 | Sirven |
| 4,781,262 A * | 11/1988 | Nakamura et al. ........... 180/414 |
| 4,796,732 A | 1/1989 | Kong |
| 4,826,094 A | 5/1989 | Whiteley |

(Continued)

FOREIGN PATENT DOCUMENTS

| | | |
|---|---|---|
| CA | 2298291 | 8/2000 |
| DE | 1280688 | 7/1972 |

(Continued)

*Primary Examiner* — Melody Burch
(74) *Attorney, Agent, or Firm* — John V. Daniluck; Bingham Greenebaum Doll LLP

(57) ABSTRACT

A damper of shock and vibration. In one embodiment there is a hydraulic damper with a regressive damping characteristic in both compression and extension, such that damping forces decrease with increased stroking velocity within a predetermined range of stroking velocity. Outside of this range, damping forces are progressive, such that the damping force increases with increased stroking velocity. In another embodiment, there is a hydraulic damper with a second, slidable piston within one of the internal chambers defined by the main piston. This secondary piston is spring loaded and hydraulically latchable at either a first position or a second position based on the pressure differential across the main piston.

16 Claims, 22 Drawing Sheets

(56) References Cited

U.S. PATENT DOCUMENTS

| | | |
|---|---|---|
| 4,972,928 A | 11/1990 | Sirven |
| 5,018,607 A | 5/1991 | Hardtke et al. |
| 5,046,402 A * | 9/1991 | Lagace .................... 92/33 |
| 5,248,014 A * | 9/1993 | Ashiba ................ 188/282.8 |
| 5,810,128 A * | 9/1998 | Eriksson et al. ........... 188/289 |
| 5,927,449 A | 7/1999 | Huang et al. |
| 5,996,979 A | 12/1999 | Hrusch |
| 6,264,015 B1 | 7/2001 | De Kock |
| 6,390,457 B1 * | 5/2002 | Roper .................... 267/119 |
| 6,446,771 B1 * | 9/2002 | Sintorn et al. ........... 188/288 |
| 6,702,075 B2 * | 3/2004 | Hartel .................. 188/282.1 |
| 6,913,128 B2 | 7/2005 | Muller |
| 6,918,473 B2 * | 7/2005 | Deferme ............. 188/322.15 |
| 6,978,872 B2 | 12/2005 | Turner |
| 7,228,948 B2 | 6/2007 | Wilda et al. |
| 7,311,036 B2 * | 12/2007 | Uchino .................. 92/165 R |
| 7,374,028 B2 | 5/2008 | Fox |
| 7,431,135 B2 * | 10/2008 | Vanbrabant .......... 188/282.5 |
| 2003/0047396 A1 * | 3/2003 | Van Wonderen et al. . 188/282.1 |
| 2004/0200946 A1 * | 10/2004 | Pradel et al. ............ 248/560 |
| 2004/0211631 A1 | 10/2004 | Hsu |
| 2006/0102440 A1 | 5/2006 | Nygren et al. |
| 2010/0096229 A1 * | 4/2010 | Azekatsu ............. 188/282.1 |

FOREIGN PATENT DOCUMENTS

| | | |
|---|---|---|
| DE | 3228694 | 2/1984 |
| DE | 3320993 | 3/1984 |
| DE | 3519483 | 12/1985 |
| DE | 3528830 | 2/1987 |
| DE | 3619402 | 12/1987 |
| DE | 3829966 | 3/1990 |
| DE | 3913912 | 10/1990 |
| DE | 4017925 | 12/1991 |
| DE | 3844862 | 4/1994 |
| EP | 0409094 | 1/1991 |
| EP | 0430368 | 5/1991 |
| EP | 1096171 | 2/2001 |
| EP | 1191251 | 3/2002 |
| EP | 1231404 | 8/2002 |
| FR | 2559716 | 8/1985 |
| FR | 2594076 | 8/1987 |
| FR | 2608519 | 6/1988 |
| GB | 2151746 | 7/1985 |
| GB | 2155584 | 9/1985 |
| GB | 2161892 | 1/1986 |
| GB | 2180320 | 3/1987 |
| GB | 2189004 | 10/1987 |
| GB | 2196092 | 4/1988 |
| GB | 2282864 | 4/1995 |
| WO | WO03102425 | 12/2003 |
| WO | WO03102426 | 12/2003 |
| WO | WO2006054994 | 5/2006 |
| WO | WO2006065235 | 6/2006 |

\* cited by examiner

REGRESSIVE HYDRAULIC DAMPER

CROSS REFERENCE TO RELATED APPLICATION

This application claims priority to U.S. Provisional Patent Application Ser. No. 60/945,365, filed Jun. 21, 2007, incorporated herein in its entirety.

FIELD OF THE INVENTION

The present invention pertains to shock and vibration dampers, and in particular to a hydraulic shock absorber having regressive characteristics.

BACKGROUND OF THE INVENTION

Vehicles that traverse a roadway must deal with irregularities in the roadway such as bumps and depressions. Many wheeled vehicles incorporate damped suspensions. The damping force levels are usually a compromise between low speed damping support of the vehicle body movements and high speed damping of bumps and depressions. Too much low speed damping for improved body control can result in a harsh ride at higher speeds with hydraulic dampers, because the hydraulic damping force is a function of the velocity of the piston and this force typically increases as the velocity increases.

What is needed is a damper that provides adequate low speed damping for improved body control, without increasing the harshness of the vehicle ride at higher speeds. The present invention does this in novel and unobvious ways.

SUMMARY OF THE INVENTION

The present invention pertains to improvements in gas and fluid dampers that provide a regressive damping characteristic in both compression and extension. One aspect of some embodiments of the apparatus is to produce a damping characteristic during damper movement in one direction in which the resistance created at low shaft velocities is greater than the damping resistance created at higher shaft velocities. In some embodiments, this regressive characteristic (in which the damping force at a high velocity is lower than the damping force at a low velocity) occurs in compression of the shock absorber, whereas in other embodiments this characteristic occurs in extension or rebound. Some embodiments of the present invention pertain to hydraulic dampers that include a hydraulic switching device that increases the flow area of a restriction in an internal flowpath during moderate velocity operation. The flow area is not increased during low velocity operation, and the increased flow area is maintained during high velocity operation.

Yet another embodiment of the present invention pertains to a damper having multiple flowpaths in parallel across the main piston of the damper. The first flowpath includes multiple fixed restrictions. The second flowpath includes one or more one-way valves. A first, higher pressure drop fixed restriction provides fluid communication during all compression operation of the damper. A second, lower pressure drop restriction is operative above a predetermined pressure differential across the main piston.

Yet another embodiment of the present invention pertains to a hydraulic damper including a first piston slidable within a first housing, and a second piston slidable within a second housing, the second housing being located within one of the chambers defined by the first piston. The second piston is operable to create multiple flowpaths between the volume defined by the first piston, with one flowpath being more restrictive than another flowpath.

Yet another embodiment of the present invention pertains to a hydraulic damper including a first piston slidable within a first housing, and a second piston slidable within a second housing, the second housing being located within one of the chambers defined by the first piston. The second piston is biased to a position by a spring, and slides between two positions based on the pressure drop across the second piston.

Yet another embodiment of the present invention pertains to a retrofit kit for a hydraulic damper. The kit includes a housing that can be coupled to either the piston or rod of the damper. The housing includes a piston slidable within an interior chamber. A spring biases the piston toward one end of the chain.

Yet another embodiment of the present invention pertains to an assembly for modifying the damping characteristics of a shock absorber. In one embodiment, the apparatus is located within a housing that is not within the cylindrical body of the shock absorber. This housing includes an inner valve assembly, the valve assembly containing a spring loaded poppet or piston. The piston or poppet is slidable relative to the inner housing in which it is located. One end of the housing has a fluid port that is in fluid communication with the inlet of the valve housing. Preferably, the housing further includes a second fluid port that is in fluid communication with the outlet of the valve housing. The piston and valve housing coact to form at least two flow paths from the inlet to the outlet. Preferably, the first, at-rest position of the valve housing relative to the piston provides a first, more restrictive flow path from inlet to outlet. In yet other embodiments, the second position of the piston relative to the valve housing opens a second, additional flow path from inlet to outlet. The inlet and outlet are in fluid communication with different ones of the rebound volume or compression volume within the cylinder, and can therefore provide, in one orientation of the assembly, a regressive force characteristic during rebound, and in the opposite orientation provide a regressive force characteristic in compression.

Yet another embodiment of the present invention pertains to a head valve for a shock absorber, the head valve including a valve assembly that provides regressive forcing characteristics. Preferably, the head valve including the valve assembly are mounted on one end of the fluid and nitrogen reservoir that compensate for hydraulic fluid expansion, hydraulic volume displaced by the central rod, or other characteristics.

In yet another embodiment of the present invention, there is an externally adjustable valve that provides the user one or more adjustments by which a regressive forcing characteristic can be modified without taking the shock absorber apart. In one embodiment, there is a first adjustment that changes the preload on a spring that biases a piston toward a first position. In some embodiments, there is a second adjustment that modifies the higher velocity portion of the regressive forcing characteristic. In some embodiments, there is a third adjustment that modifies the lower velocity portion of the regressive forcing characteristic.

These and other features and aspects of different embodiments of the present invention will be apparent from the claims, specification, and drawings.

BRIEF DESCRIPTION OF THE DRAWINGS

FIG. 4b is a schematic representation of the shock absorber of FIG. 4a.

FIG. 10b is a close up of a portion of the apparatus of FIG. 10a.

DESCRIPTION OF THE PREFERRED EMBODIMENT

Figure 1A:
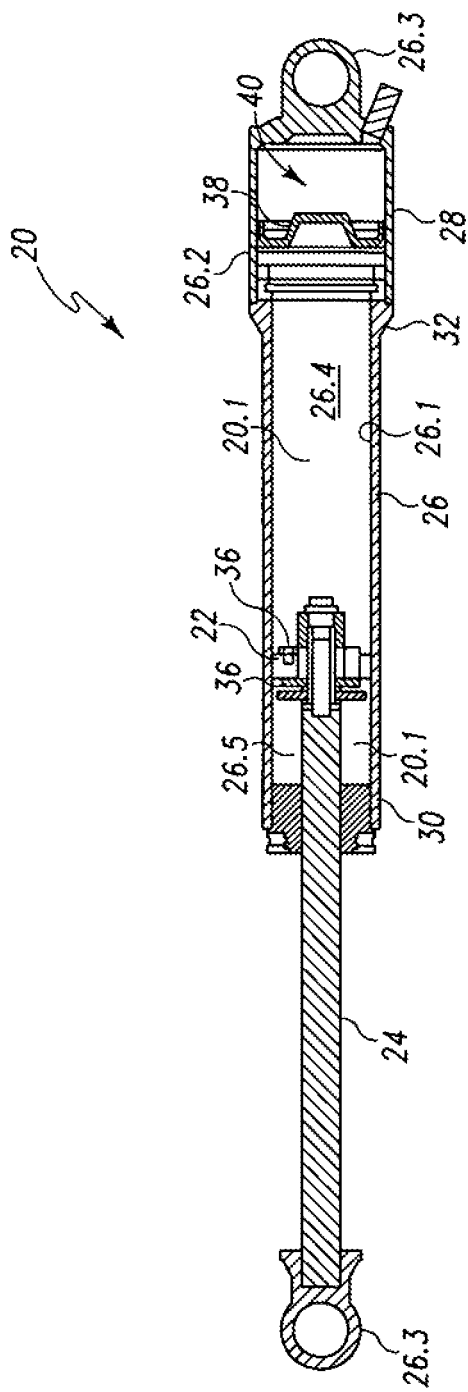
FIG. 1a is a cutaway view of a prior art shock absorber.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The use of an N-series prefix for an element number (NXX) refers to an element that is the same as the non-prefixed element (XX), except as shown and described thereafter. Although various specific quantities (spatial dimensions, temperatures, pressures, times, force, resistance, current, voltage, concentrations, etc.) may be stated herein, such specific quantities are presented as examples only, and are not to be construed as limiting.

One embodiment of the present invention pertains to a damper having regressive characteristics in both rebound and compression. As one example, during compression of the damper at low velocity, the force required to compress the damper progressively increases as the compressive velocity of the damper increases. During operation at moderate compressive velocities, the force required to compress the damper regressively decreases as the velocity increases. At still higher compressive velocities, the damping force progressively increases with increased compressive velocity.

One embodiment of the present invention pertains to a damper having regressive characteristics. During extension of the damper at low velocity, the force required to extend the damper progressively increases as the extensive velocity of the damper increases. During operation at moderate extensive velocities, the force required to extend the damper regressively decreases as the velocity increases. At still higher extensive velocities, the damping force progressively increases with increased extensive velocity.

FIG. 1a shows a cross-sectional view of a prior art shock absorber 20. A main piston 22 is coupled to a moveable rod 24, piston 22 being slidably received within the inner diameter 26.1 of a main cylinder 26. Piston 22 is retained on the end of rod 24 by a coupling nut 24.2. Main piston 22 generally subdivides the internal volume of cylinder 26 into a compression volume 26.4 located between piston 22 and the compression end 28 of shock 20, and a second rebound volume 26.5 located between piston 22 and the rebound end 30 of shock 20. The movement of piston 22 and rod 24 toward rebound end 32 results in a reduction in the size of compression volume 26.1, and the subsequent flow of hydraulic fluid 20.1 through a compression flowpath 32 in piston 22 and into the simultaneously enlarging rebound volume 26.5. Likewise, movement of piston 22 toward rebound end 30 of shock 20 results in the flow of hydraulic fluid 20.1 through a rebound flowpath 34 in piston 22 and into the simultaneously enlarging compression volume 26.4.

In order to compensate for changes in the density of hydraulic fluid 20.1 and shaft-displaced fluid, shock absorber 20 includes a nitrogen chamber separated by a reservoir piston 38 from the fluid-wetted volume of cylinder 26.

Shock absorber 20 is typically used with the suspension of a vehicle. Rod 24 includes a first suspension attachment 26.3, and end cap 26.2 of cylinder 26 includes a second suspension attachment 26.3. These suspension attachments 26.3 permit the pivotal connection of shock absorber 20 to a portion of the vehicle suspension on one end, and on the other end to a portion of the vehicle frame. It is well known to use shock absorbers on many types of vehicles, including motorcycles, buses, trucks, automobiles, and airplanes. Further, although shock absorber 20 has been referred to for being used on a vehicle, shock absorbers are also known to be used in other applications where it is beneficial to dampen the movement of one object relative to another object, such as dampers for doors.

Compression flowpath 32 includes a fluid passageway interconnecting volumes 26.4 and 26.5 with a one-way valve in the flowpath 32. This one-way valve can be one or more annular shims which are prevented from flexing in one direction (and thus substantially restricting flow), but able to flex in a different direction (and thus allow flow in this opposite direction). Likewise, rebound flowpath 34 provides fluid communication between volumes 26.4 and 26.5 through a one-way valve. Often, the one-way valve of the compression flowpath 32 has different characteristics than the one-way valve of rebound flowpath 34.

Figure 1B:
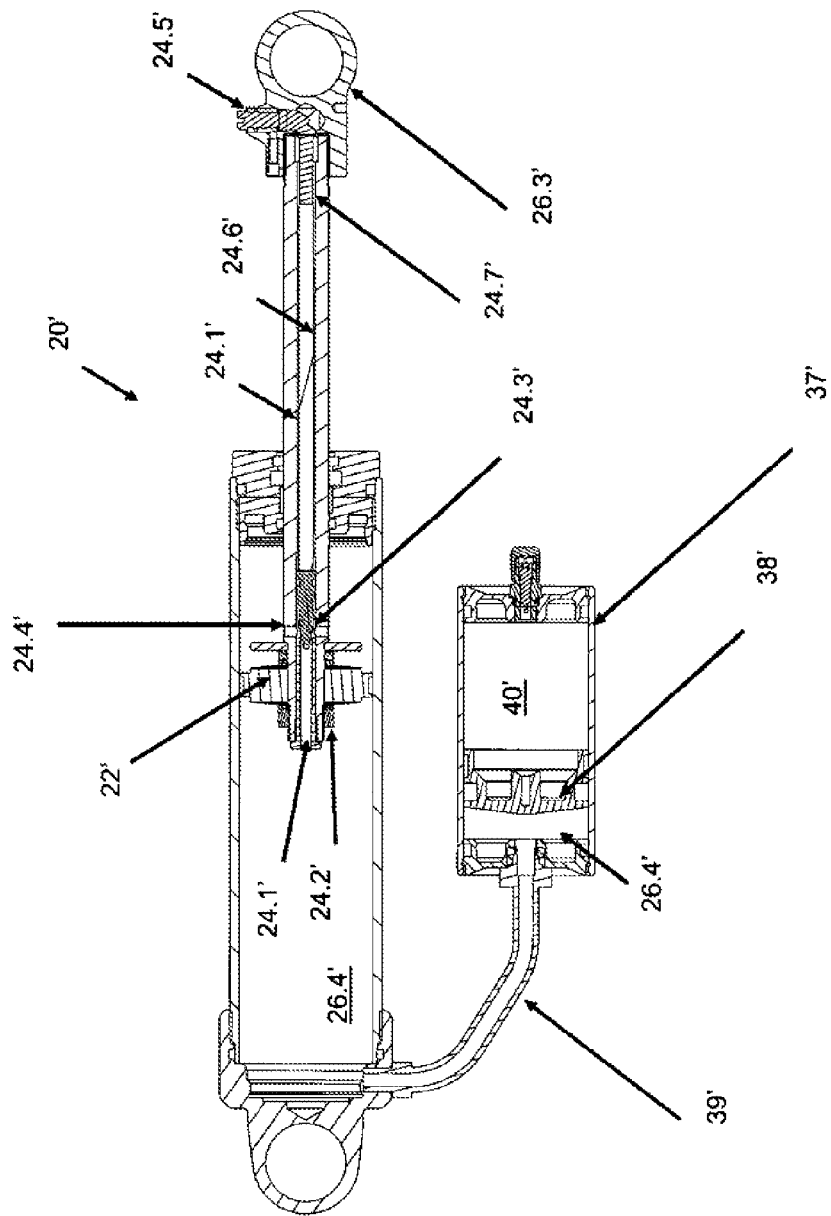
FIG. 1b is a cutaway view of another prior art shock absorber.

FIG. 1b shows a cross-sectional view of a second prior art shock absorber 20'. Shock absorber 20' includes a second, separate cylinder 37' which includes gas reservoir 40'. A piston 38' slidably received within cylinder 37' separates gas volume 40' from compression volume 26.4'. An external fluid connection 39' interconnects the hydraulic fluid end of piston 37' with the compression end of shock absorber 20'. Cylinder 37' includes a gas port in one end of cylinder 37' for entry or removal of nitrogen.

Shock absorber 20' includes means for varying the fluid resistance of a flowpath interconnecting compression volume 26.4' and rebound volume 26.5'. Rod 24' includes an internal passage 24.1' that extends out one end of shaft 24', and extends in the opposite direction towards attachment 26.3'. The open end of internal passage 24.1' is in fluid communication with one or more orifices 24.4' that extend from internal passage 24.1' to rebound volume 26.5'. The flow of fluid through this internal passageway between the compression and rebound volumes is restricted by a metering needle 24.3' received within internal passage 24.1'. The position of metering needle 24.3' can be altered by a pushrod 24.6' also extending within internal passage 24.1'. Push rod 24.6' includes an end 24.7' that is adapted and configured to mate with an internal adjustment screw 24.5'. The inward adjustment of screw 24.5' acts on the angled interface to push rod 24.6' and adjustment needle 24.3' toward a position of increased resistance in the internal flowpath.

Figure 1C:
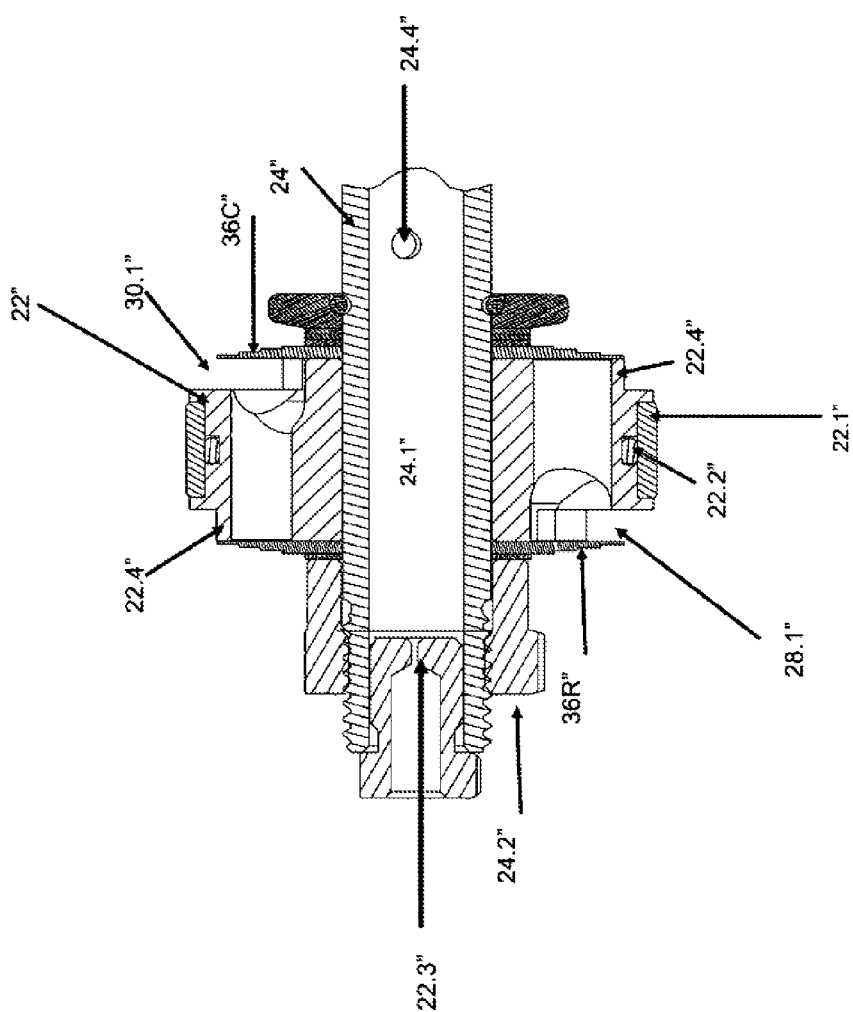
FIG. 1c is a cutaway view of a portion of another prior art shock absorber.

FIG. 1c is a cross sectional view of a portion of another prior art shock absorber. The apparatus in FIG. 1c shows a piston 22" coupled to a shaft 24" by a coupling nut 24.2". Shaft 24" includes an internal flowpath from orifice 22.3" through internal passage 24.1" and into shaft orifice 24.4". This internal flowpath bypasses piston 22". Piston 22" includes a pair of shim sets 36", each shim set shown including 4 individual washers. During operation in compression (i.e., movement in FIG. 1c toward the left) fluid is able to freely enter compression flowpath 28.1". However, fluid is unable to exit through flowpath 28.1" and into the rebound side of the shock absorber unless fluid pressure is sufficiently great to bend the periphery shim stack 36O" away from the shim edge support 29.4" of piston 22". During operation in rebound, (i.e., movement in FIG. 1c toward the right) fluid is able to freely enter compression flowpath 30.1". However, fluid is unable to exit through flowpath 30.1" and into the compression side of the shock absorber unless fluid pressure is sufficiently great to bend the periphery shim stack 36R" away from the shim edge support 29.4" of piston 22". A resilient seal 22.1" substantially seals the compressive side of piston 22" from the rebound side of piston 22". An energizing backup seal 22.2" urges seal 22.1" outwardly into contact with the inner wall of the cylinder.

Although what has been shown described is a shock absorber 20 that is linear in operation, the prior art of shock absorbers further includes rotary dampers, such as the toroidal damper disclosed in U.S. Pat. No. 7,048,098, incorporated herein by reference. In addition, although FIGS. 1a, 1b, and 1c depict particular types of prior art shock absorbers, the various embodiments of the present invention are not so constrained. For example, the regressive valve assemblies and methods described and shown herein are further applicable with shock absorbers as disclosed in U.S. patent application Ser. No. 11/261,777, filed Oct. 31, 2005 for inventors Nygren and Loow.

As used herein, the word compression refers to the action and direction of the shock absorber during compression of the wheel suspension, this term being synonymous with the term jounce. Therefore, the end of the shock absorber referred to as a compression end is the end which has a reduction in internal volume (due to movement of the piston relative to the cylinder) during compression of the vehicle suspension. The rebound end of the shock absorber is the end that is opposite of the compression end.

Figure 2:
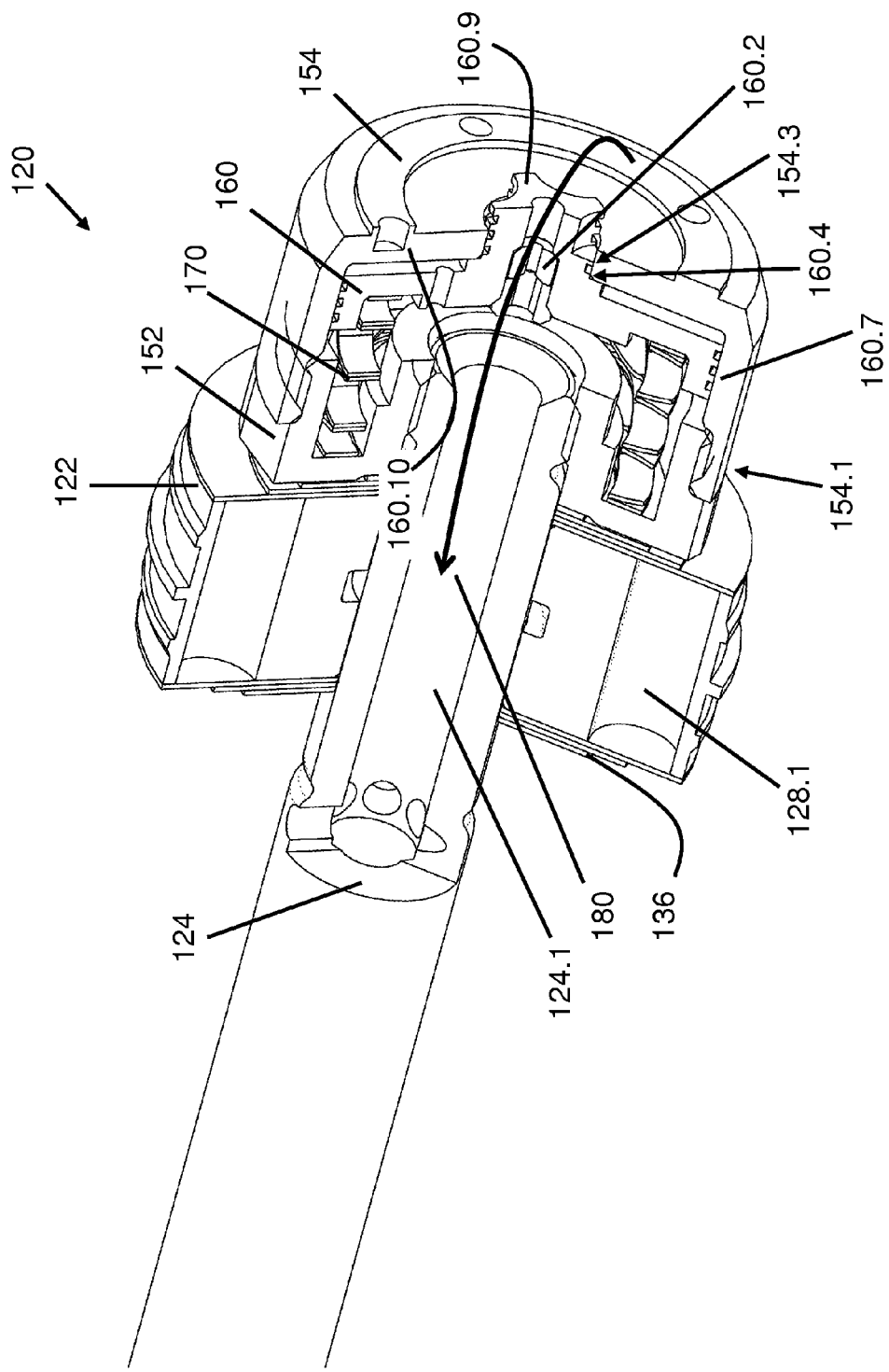
FIG. 2 is a cross-sectional perspective view of a portion of a shock absorber according to one embodiment of the present invention.
Figure 3:
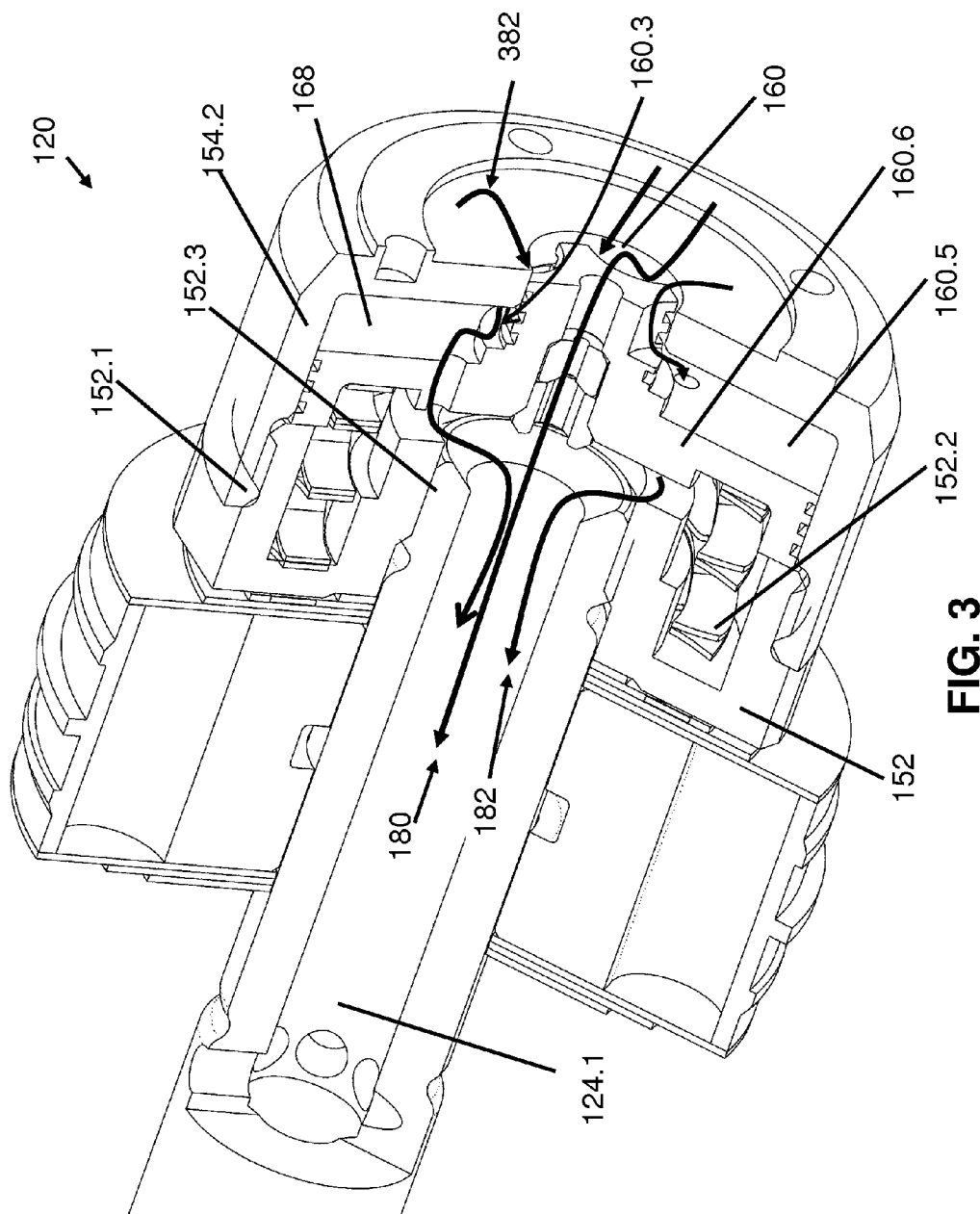
FIG. 3 is a view of the shock absorber of FIG. 2 operating in a regressive mode.

FIGS. 2 and 3 are prospective, cutaway views of a portion of a shock absorber 120 according to one embodiment of the present invention. For the sake of clarity, only certain portions of shock absorber 120 are shown. Shock absorber 120 includes a housing assembly 150 according to one embodiment of the present invention. In one embodiment, valve housing assembly 150 comprises a first part 152 and second part 154 that are threadably coupled by threads 152.1 and 154.1 to form housing 150. Valve housing assembly 150 includes a piston 160 which is slidable within an internal chamber formed by the coupling of first part 152 to second part 154.

A spring 170 biases piston 160 toward one end of the internal chamber. Spring 170 is received within a spring pocket defined at one end by a pocket 152.2 in the first part 152 of housing 150, and defined at the other end by a spring receiving pocket or spring-receiving surface 160.8 of piston 160. When first part 152 and second part 154 of housing 150 are threadably coupled together, spring 170 is adapted and configured to place a predetermined force on the underside surface 160.8, such that piston 160 is preloaded toward one end of its range of travel.

Preferably, housing assembly 150 is threadably coupled to the end of rod 124 in place of, or proximate to, a coupling nut (not shown). In one embodiment, housing 150 is threadably coupled to rod 124 proximate to main piston 122. However, the present invention also contemplates those embodiments in which housing 150 is further integrated with piston 122, including those embodiments in which secondary piston 160 and spring 170 are incorporated within the main piston.

Referring to FIG. 2, piston 160 is slidable within an internal chamber formed by the coupling of housing first part 152 to housing second part 154. In FIG. 2 piston 160 is shown in the first position, as would be experienced during rebound operation of shock absorber 120, and also during lower velocity compression operation. A projection 160.9 of piston 160 projects from a substantially planar face and further extends within an aperture 154.3 of second housing part 154.

In some embodiments of the present invention, piston 160 includes a central orifice 160.2 that provides fluid communication between compression volume 126.4 and rebound volume 126.5 by way of internal passage 124.1 of rod 124 during all operation of the damper. However, the present invention also contemplates those embodiments in which a similar flowpath is established through main piston 122, and also those embodiments in which there is no fixed restriction between the compression volume and rebound volume that is operable during all operation of the damper.

Housing assembly 150 is generally exposed to hydraulic pressure within the compression volume 126.4 of shock 120. Therefore, this hydraulic pressure is communicated to a portion 160.6 of piston 160 that is in fluid communication with aperture 154.3. Hydraulic pressure within compression volume 126.4 coacts with the portion 160.6 of the surface area of piston 160 to apply a force to piston 160 that tends to push piston 160 away from second housing part 154.

The pressure force on piston 160 described above is opposed by a spring force. Spring 170 is adapted and configured to be preloaded when installed within housing 150. Spring 170, located within a pocket 152.2 of first housing part 152, applies a biasing force to push piston 160 toward the first position. There is hydraulic pressure applied to the underside 160.10 of piston 160. This underside pressure is communicated from orifices 124.4 in rod 124 into internal passage 124.1. The hydraulic pressure within internal passage 124.1 is also influenced by hydraulic fluid that flows between compression volume 126.4 and rebound volume 126.5 by way of main orifice 160.2. This pressure is communicated to the volume of the internal chamber generally bounded by spring pocket 152.2 and the underside 160.10 of piston 160.

This pressure within passage 124.1 is further communicated through a plurality of peripheral orifices 160.3 in the body of piston 160. These orifices communicate this underside hydraulic pressure to the front side of piston 160 (i.e., the volume between the opposing planar surfaces of piston 160 and housing part 154). Because of communication through orifices 160.3, the pressure force on piston 160 in the first position results from the coaction of the difference in pressures between compression volume 126.4 and the pressure within internal passage 124.1, acting on the portion of surface area of piston 160 that projects from aperture 154.3.

Piston 160 is slidably received within the inner cylindrical circumferential wall 154.2 of housing part 154. In some embodiments, the outer diameter 160.1 of piston 160 discourages leakage flow within the internal chamber by way of a close fit between the outer diameter 160.1 of piston 160 and the walls 154.2 of housing 154. However, in some embodiments piston 160.6 includes a seal to discourage leakage flow, such as a Teflon® seal backed up by a spring.

Leakage flow of hydraulic fluid from compression volume 126.4 into the third internal volume of internal chamber 156 is discouraged by a close fit between a portion of the outer diameter of projection 160.9 and the side walls of aperture 154.3. In one embodiment, projection 160.9 includes a generally cylindrical portion 160.4 for sealing purposes, and also a scalloped portion which maintains guidance of the projection within the aperture, the scalloped portions also permitting flow of hydraulic fluid after the sealing portion 160.4 of projection 160.9 moves out of aperture 154.3. This flow past the scalloped portion occurs when piston 160 moves toward its second position.

FIG. 3 shows piston 160 in its second position during regressive operation of shock absorber 120. Piston 160 moves toward this position when the pressure differential between the pressure in compression volume 126.4 and the pressure within passage 124.1 coact with the surface area of projection 160.9 sufficiently to overcome the biasing force of spring 170. As piston moves away from the first position, the sealing portion 160.4 of projection 160.9 no longer discourages flow into the chamber of housing 150. Further, the scalloped sections of the projection permit flow from compression volume 126.4 into chamber 156. As hydraulic fluid enters internal chamber 156, it flows into internal passage 124.1 of rod 124 by way of one or more secondary flow orifices 160.3 located within piston 160. Flow orifices 160.3 are laterally displaced from central orifice 160.2.

The operation of a valve assembly 150 having a slidable, sealed piston preloaded by a spring 170 within threadably coupled members 154 and 152 can be adapted to provide regressive forcing characteristics for both compression and extension (or rebound) of a shock absorber. Further, the general operation of a regressive valve assembly as previously described can be adapted in various other configurations of apparatus as will now be shown and described.

Figure 4A:
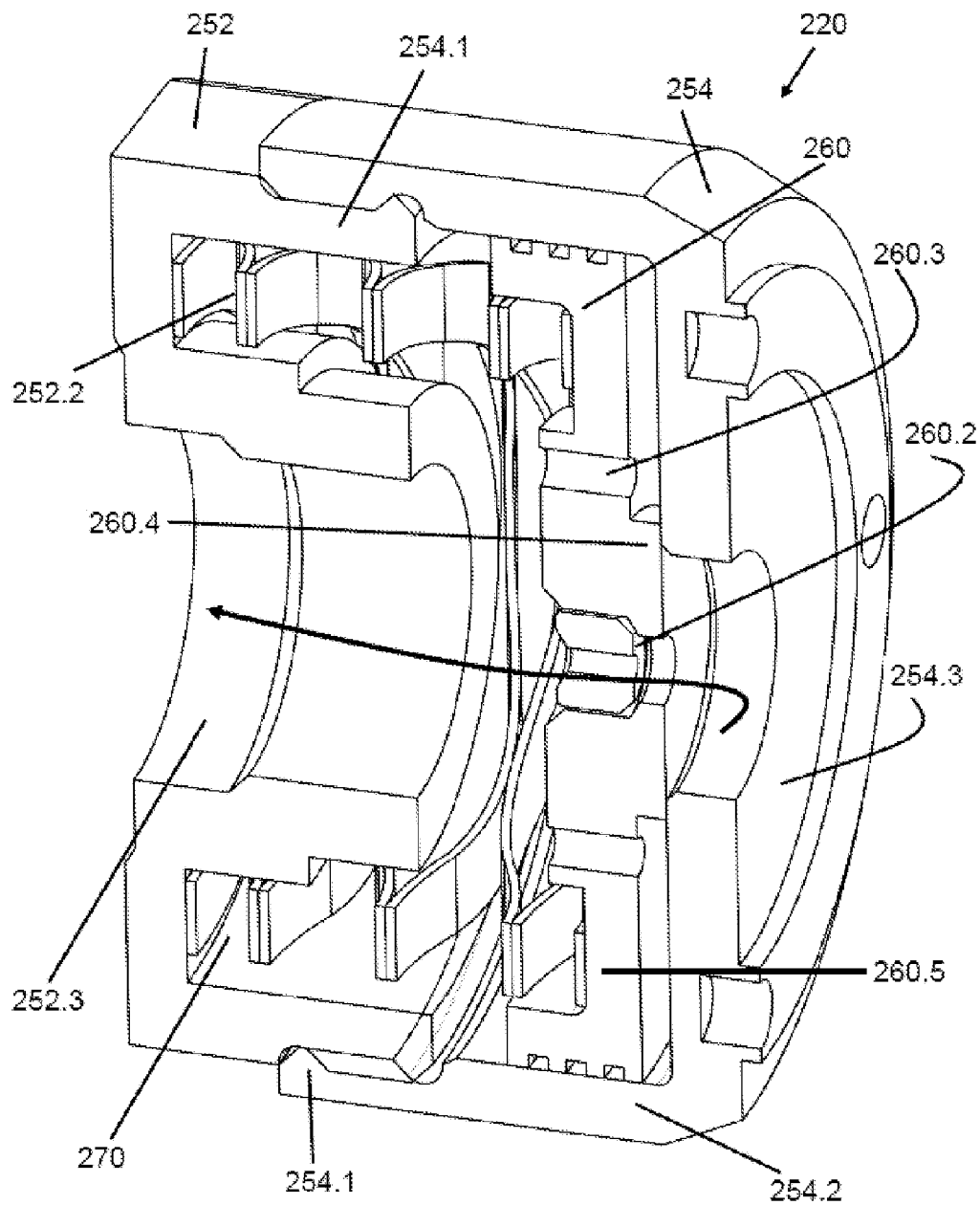
FIG. 4a is a cross-sectional perspective view of a portion of a shock absorber according to another embodiment of the present invention.

FIG. 4a is a perspective, cutaway view of a portion of a shock absorber 220 according to one embodiment of the present invention. For the sake of clarity, only certain portions of shock absorber 220 are shown. Shock absorber 220 includes a valve housing assembly 250 according to one embodiment of the present invention. In one embodiment, valve housing assembly 250 comprises a first part 252 and second part 254 that are threadably coupled by threads 252.1 and 254.1 to form housing 250. Housing assembly 250 includes a piston 260 which is slidable within an internal chamber formed by the coupling of first part 252 to second part 254.

A spring 270 biases piston 260 toward one end of the internal chamber. Spring 270 is received within a spring pocket defined at one end by a pocket 252.2 in the first part 252 of housing 250, and defined at the other end by a spring receiving pocket or surface 260.8 of piston 260. When first part 252 and second part 254 of housing 250 are threadably coupled, spring 270 is adapted and configured to place a predetermined force on the underside surface 260.8, such that piston 260 is preloaded toward one end of its range of travel.

Preferably, housing assembly 250 is threadably coupled to the end of rod 224 in place of, or proximate to, a coupling nut (not shown). In one embodiment, housing 250 is threadably coupled to rod 224 proximate to main piston 222. However, the present invention also contemplates those embodiments in which housing 250 is further integrated with piston 222, including those embodiments in which secondary piston 260 and spring 270 are incorporated within the main piston.

Piston 260 is slidable within an internal chamber formed by the coupling of housing first part 252 to housing second part 254. Piston 260 is shown in the first position, as would be experienced during rebound operation of shock absorber 220 and also during low velocity compression operation. A projection 260.9 of piston 260 projects as a plateau from a substantially planar face of piston 260, and further extends into contact with the face and edge of an aperture 254.3 of second housing part 254.

In some embodiments of the present invention, piston 260 includes a central orifice 260.2 that provides fluid communication (and in some embodiments a first flowpath) between compression volume 226.4 and rebound volume 226.5 by way of internal passage 224.1 of rod 224 during all operation of the damper. However, the present invention also contemplates those embodiments in which a similar flowpath is established through main piston 222, and also those embodiments in which there is no fixed restriction between the compression volume and rebound volume that is operable during all operation of the damper.

Housing assembly 250 is generally exposed to hydraulic pressure within the compression volume 226.4 of shock 220. Therefore, this hydraulic pressure is communicated to a portion 260.6 within plateau 260.9 of piston 260 that is in fluid communication with aperture 254.3. Hydraulic pressure within compression volume 226.4 coacts with the surface of portion 260.6 to apply a force to piston 260 that tends to push piston 260 away from second housing part 254.

The force on piston 260 described above is opposed by a pressure and spring force. Spring 270, located within a pocket 252.2 of first housing part 252, applies a biasing force to push piston 260 toward the first position. There is hydraulic pressure is applied to the underside 260.10 of piston 260. This underside pressure is communicated from orifices 224.4 in rod 224 into internal passage 224.1. The hydraulic pressure within internal passage 224.1 is also influenced by hydraulic fluid that flows between compression volume 226.4 and rebound volume 226.5 by way of a main orifice 260.2. This pressure is communicated to the volume of the internal chamber generally bounded by spring pocket 252.2 and the underside 260.10 of piston 260.

This pressure within passage 124.1 is further communicated through a plurality of peripheral orifices 260.3 in the body of piston 260. These orifices communicate this underside hydraulic pressure to the front side of piston 260 (i.e., the volume between the opposing planer surface of piston 260 and housing part 254. Because of communication through orifices 260.3, the pressure force on piston 260 in the first position results from the coaction of the difference in pressures between compression volume 226.4 and the pressure within internal passage 224.1, acting on the surface area of piston 160 that projects from aperture 254.3.

Piston 260 is slidably received within the cylindrical circumferential wall 254.2 of housing part 254. In some embodiments, the outer diameter 260.1 of piston 260 discourages leakage flow within the internal chamber by way of a close fit between the outer diameter 260.1 of piston 260 and the walls 254.2 of housing 254. However, in some embodiments piston 260.6 includes a slidable seal to discourage leakage flow, such as a Teflon® seal backed up by a spring.

Leakage flow of hydraulic fluid from compression volume 226.4 into the third internal volume of internal chamber 256 is discouraged by a face seal 260.4 between a portion of the outer diameter of projection 260.9 and the edge of aperture 254.3. In one embodiment, projection 260.9 includes a generally cylindrical plateau for sealing purposes. The abutting faces of plateau 260.9 and the edge of aperture 254.3 are smooth and coplanar to form the face seal. In yet other embodiments, one or both of these abutting surfaces can include a resilient face seal, such as a elastomeric seal molded or placed within a groove on plateau 260.9.

During regressive operation of shock absorber 220, Piston 260 moves toward the second position. When the pressure differential between the pressure in compression volume 226.4 and the pressure within passage 224.1 coact with the surface area of projection 260.9, is sufficient to overcome the biasing force of spring 270, piston 260 moves away from the first position, and the face seal between projection 260.9 and the edge of aperture 254.3 no longer discourages flow into the internal chamber of housing 250. Movement of piston 260 toward the second position creates a gap between the formerly abutting surfaces into which hydraulic fluid flows from compression volume 226.4. Such movement of piston 260 is similar to the movement of piston 160 shown in FIG. 3. Referring again to FIG. 4, as hydraulic fluid enters internal chamber 256, it flows into internal passage 224.1 of rod 224 by way of one or more secondary flow orifices 260.3 located within piston 260 (and in some embodiments flow through the secondary flow orifices along with flow through central orifice 260.2 comprise a second flowpath, this second flowpath being less restrictive than the first flowpath because of the addition and uncovering of the flow orifices 260.3). Flow orifices 260.3 are preferably laterally displaced from central orifice 260.2.

Figure 4B:
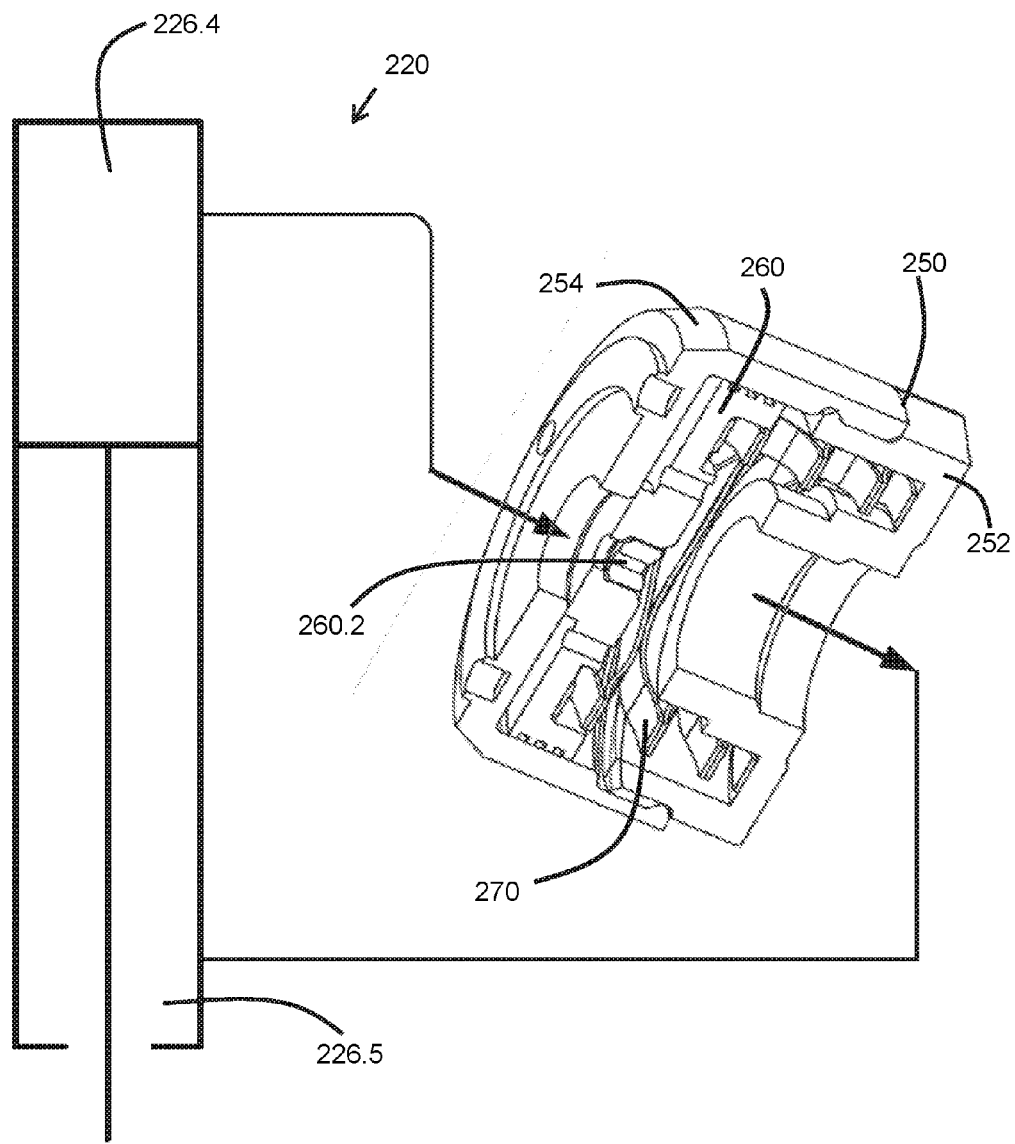

FIG. 4b is a schematic representation of the shock absorber of FIG. 4a. During regressive operation of shock absorber 220, piston 260 moves toward the second position. Movement of piston 260 toward the second position creates a gap between the formerly abutting surfaces into which hydraulic fluid flows from compression volume 226.4. During lower velocity compression of shock absorber 220, hydraulic fluid flows from compression volume 226.4 into rebound volume 226.5 through central orifice 260.2 of piston 260, and also through a one-way valve 236 of main piston 222.

Figure 4C:
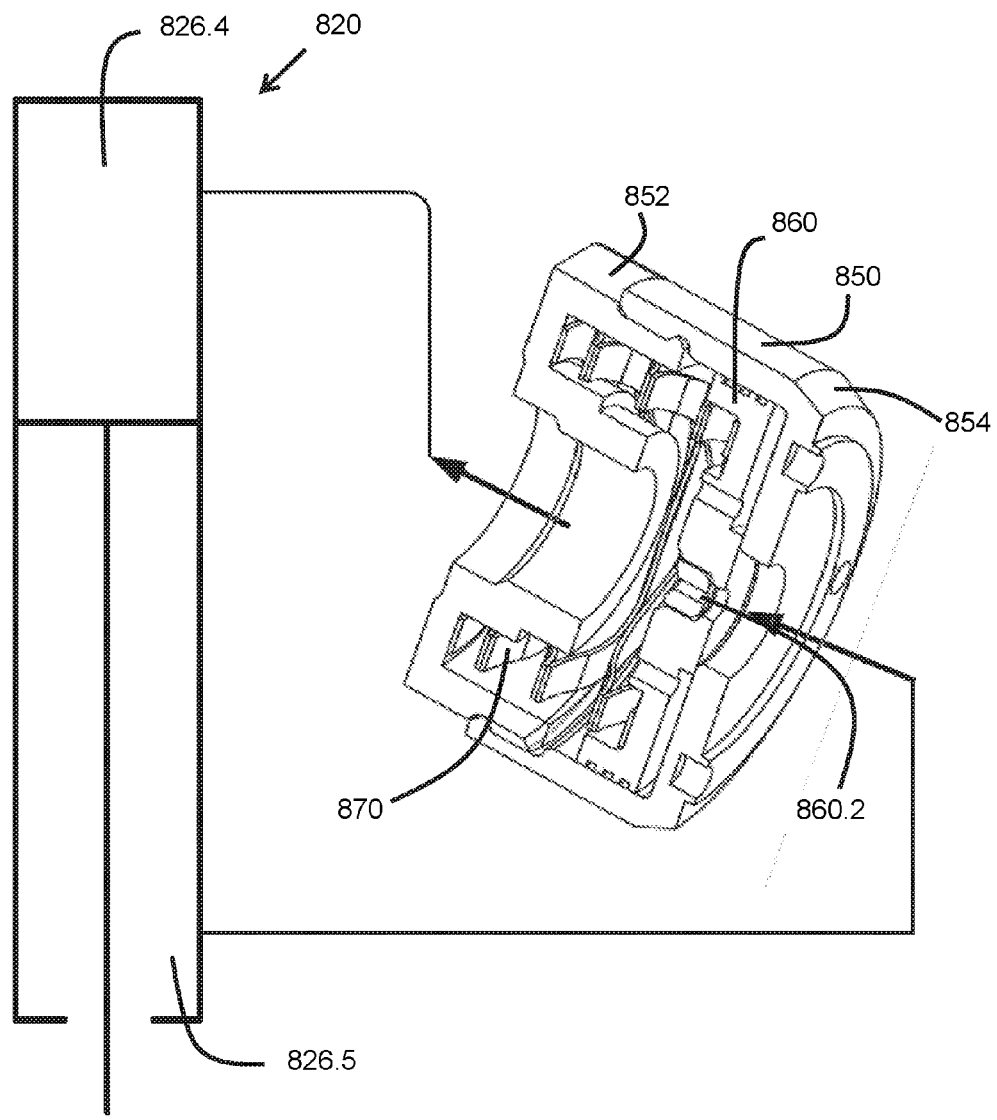
FIG. 4c is a schematic representation of an apparatus according to another embodiment of the present invention providing regressive operation during rebound.

FIG. 4c is a schematic representation of an apparatus according to another embodiment of the present invention providing regressive operation during rebound. During regressive operation of shock absorber 820, piston 860 moves toward the second position. Movement of piston 860 toward the second position creates a gap between the formerly abutting surfaces into which hydraulic fluid flows from rebound volume 826.5. During lower velocity rebound of shock absorber 820, hydraulic fluid flows from rebound volume 826.5 into compression volume 826.4 through central orifice 860.2 of piston 860, and also through a one-way valve 836 of main piston 822.

Figure 5:
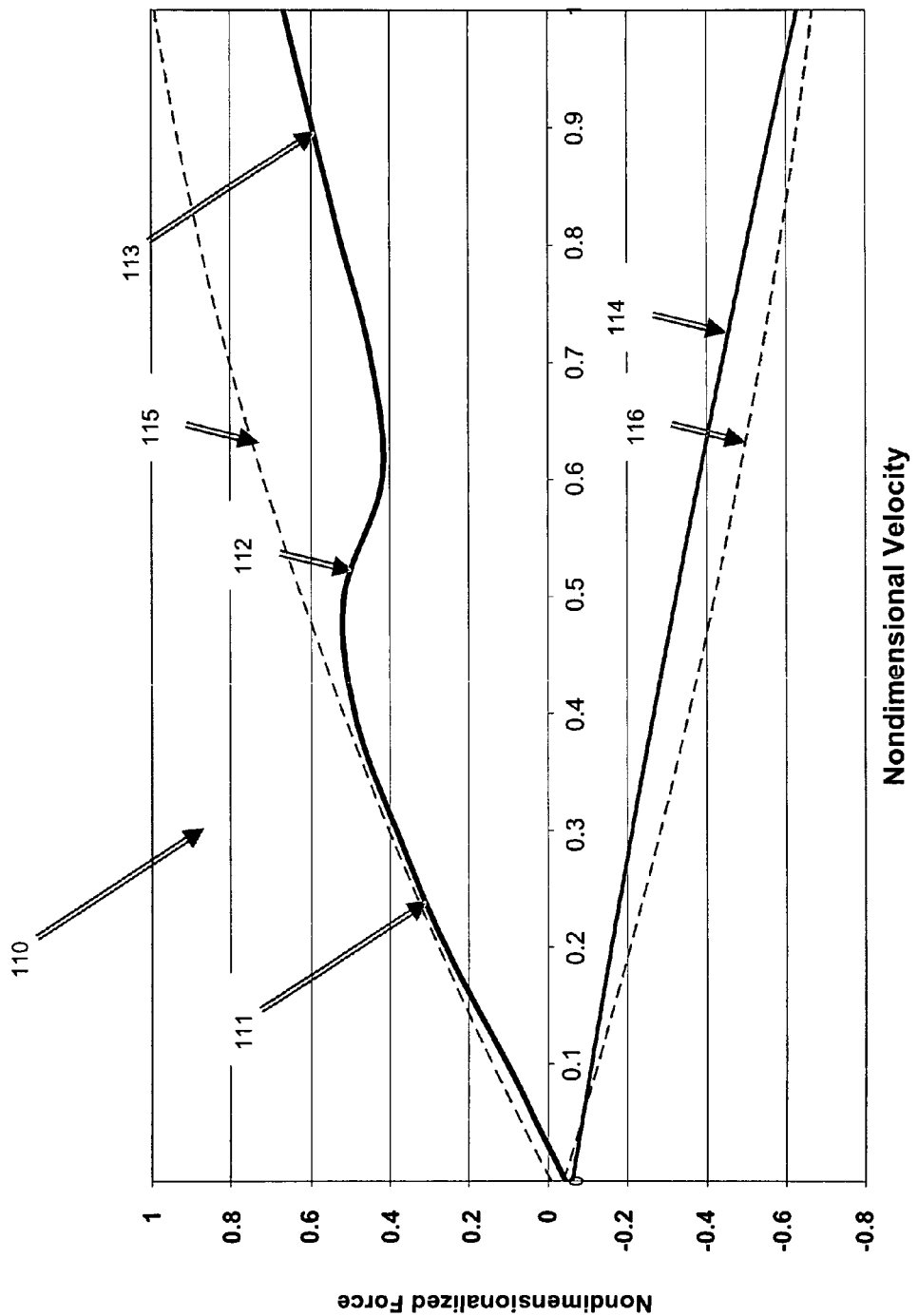
FIG. 5 is a graphical depiction of the characteristics of a shock absorber having regressive characteristics in compression according to another embodiment of the present invention.

FIG. 5 graphically depicts the damping force characteristics 110 of a shock absorber according to one embodiment of the present invention. Damping curves 110 include graphical depictions 111, 112, and 113 of compressive operation, and graphical depiction 114 of rebound operation. In addition, FIG. 5 includes graphical depictions 115 and 116 of the compressive and rebound characteristics, respectively, of a known shock absorber. Explanation of damping curves 110 will now be made in reference to shock absorber 220, and it is understood that this explanation is generally applicable to shock absorber 120 as well.

During lower velocity compression of shock absorber 220, hydraulic fluid flows from compression volume 226.4 into rebound volume 226.5 through central orifice 260.2 of piston 260, and also through a one way valve 236 of main piston 222. Referring to FIG. 5, the relationship between the damping force and shock absorber relative velocity is indicated by a first progressive portion 111 of composite damping curves 110.

At moderate compressive velocities, the pressure force acting on piston 260 causes it to move from a first, sealing position toward a second, open position. This movement of piston 260 results in the ability of hydraulic fluid from compression volume 226.4 to flow through secondary orifices 260.3 of piston 260, as well as through central orifice 260.2. This additional flow area results in a reduction in pressure within compression volume 226.4, such that the pressure drop across main piston 222 is reduced and the damping force is reduced. Operation in this regime is depicted by the regressive portion 112 of damping curves 110.

However, this reduction in pressure does not result in piston 260 moving back to the first position, since the pressure of compression volume 226.4 is communicated to a larger surface area in the second position. Therefore, the coaction of a reduced pressure differential with an increased surface area results in a pressure force capable of maintaining piston 260 in the second position.

At still higher relative higher compressive velocities (as depicted by the second progression portion 113 of damping curve 110), the regressive contribution of housing assembly 250 remains relatively constant, and the overall damping characteristics of the shock absorber are dictated primarily by the one way valves 236 of piston 222, as well as any metering needles 224.3, or other flow components of piston 220. The resultant combined characteristic in compressive flow is thus that of a higher pressure drop fixed restriction in parallel with a one way valve at low velocities, and a lower pressure drop fixed restriction in parallel with a one way valve the same one way valve at higher velocities. There is an initial progressive characteristic, followed by a regressive characteristic, which is followed by a second progressive characteristic that is substantially parallel to an extension of the first progressive characteristic. This second progressive characteristic provides a damping characteristic at higher rod velocities.

Figure 6:
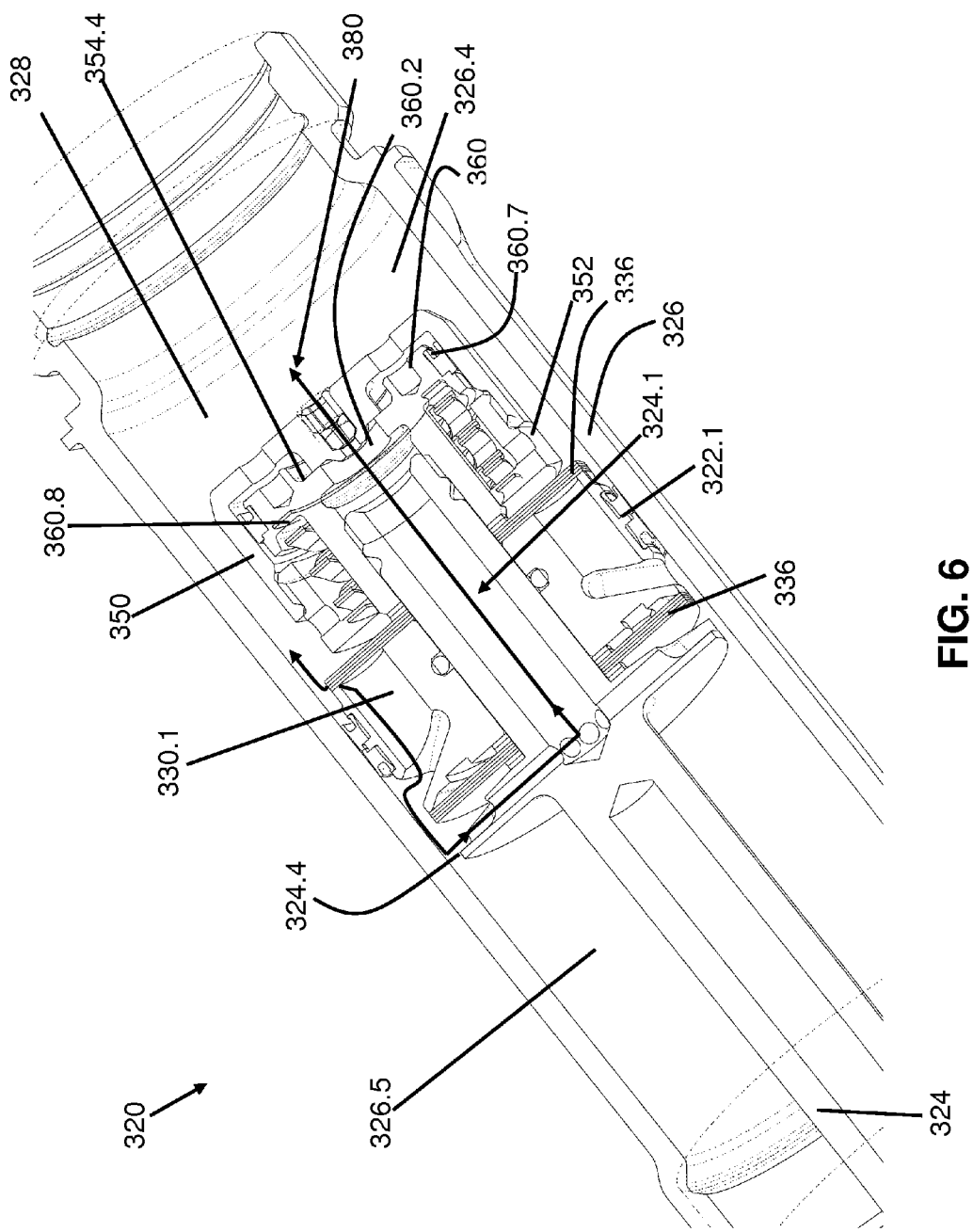
FIG. 6 is a perspective cross sectional view of the apparatus of FIG. 8 installed within a damper.
Figure 7:
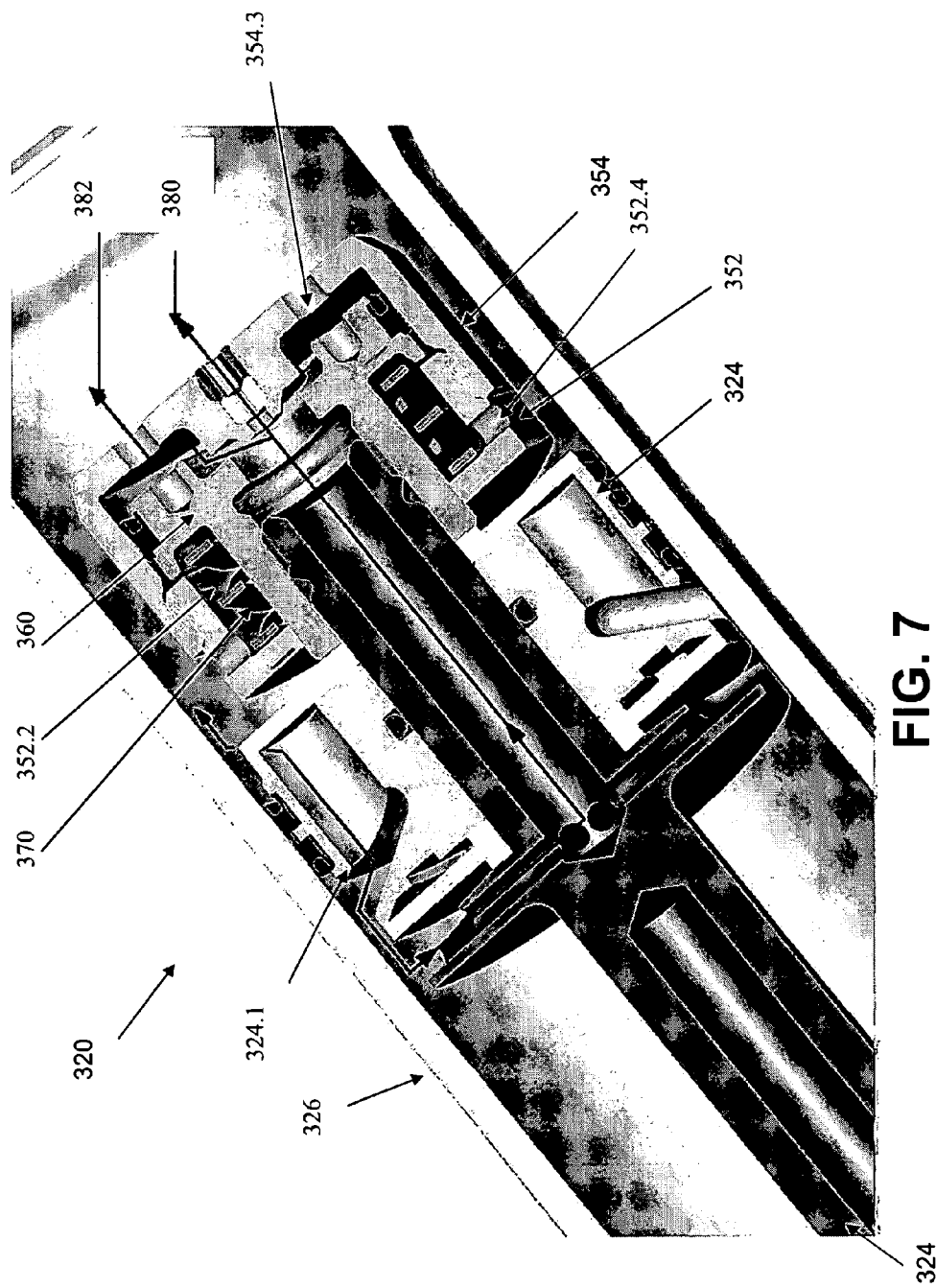
FIG. 7 is a perspective cross sectional view of the apparatus of FIG. 8 installed within a damper during a different mode of operation.
Figure 8:
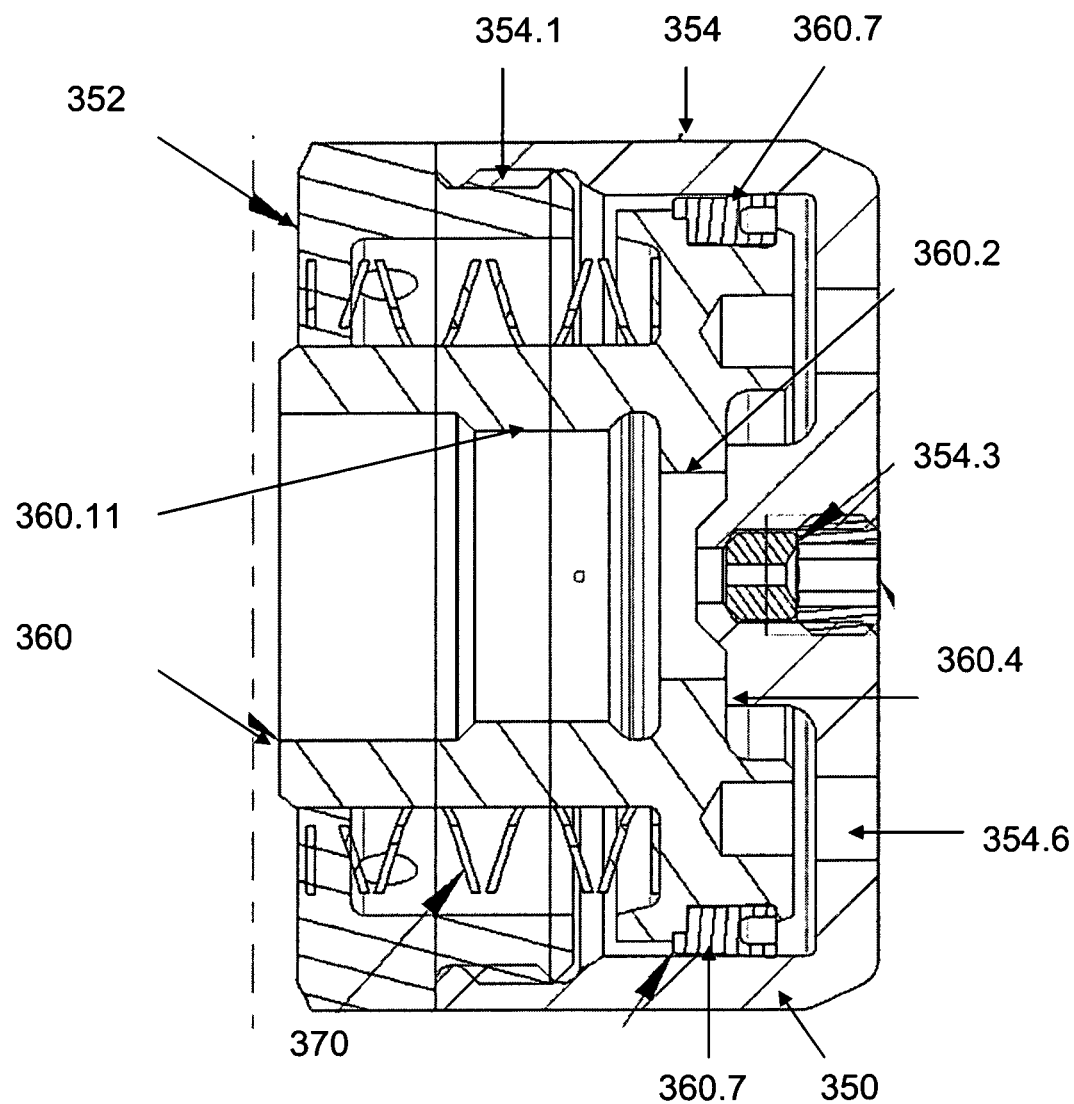
FIG. 8 is a cross sectional view of a portion of a shock absorber according to one embodiment of the present invention.
Figure 11:
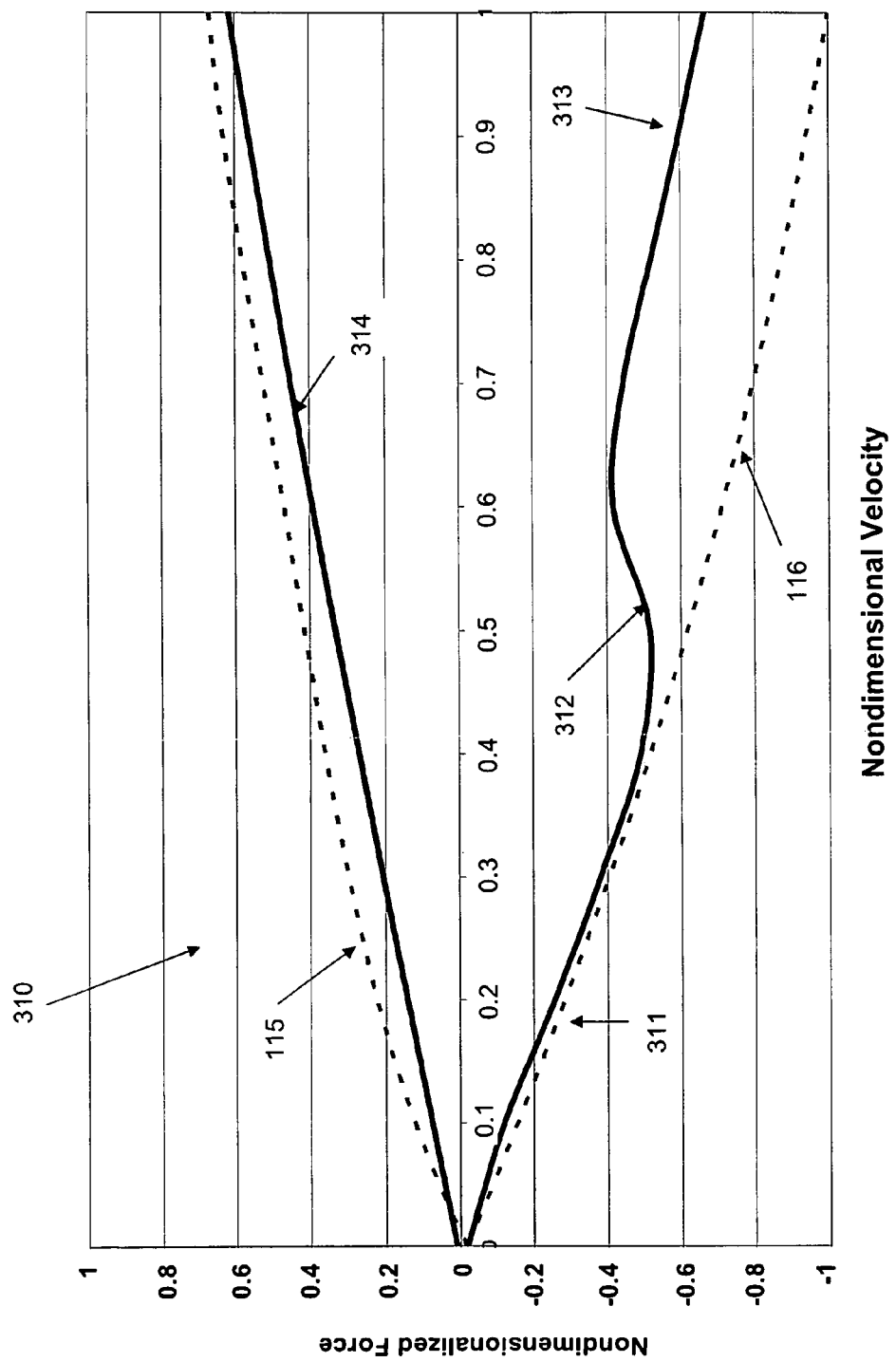
FIG. 11 is a graphical depiction of the characteristics of a shock absorber having regressive characteristics in rebound according to another embodiment of the present invention.

In one illustrative embodiment, the initial progressive characteristic extends up to about 4 inches/second. The regressive characteristic extends from about 5 to 6 inches/second. The second progressive characteristic extends from about 7 inches/second. In one illustrative embodiment, the second progressive characteristic is about 75 lbf lower than a substantially parallel extension of the first progressive characteristic. FIGS. 6, 7, and 8 represent a shock absorber 320 according to another embodiment of the present invention. Shock absorber 320 includes a regressive valve assembly 350 that provides a regressive forcing characteristic during extension of the shock absorber. These regressive extension characteristics are shown graphically in FIG. 11.

Valve housing assembly 350 is similar to valve housing 150 and 250 as previously described, except for the changes discussed and shown herein.

Valve housing 350 includes a piston or poppet 360 that is slidably movable relative to first members 352 and 354. Piston 360 includes an internally threaded bore that is threadably received on the end of rod 324. Piston 360 thus moves with rod 324. A spring 370 is captured between a spring pocket 352.2 of member 352 and spring pocket 360.8 of piston 360. Spring 370 biases piston 360 relative to threadably couple the members 352 and 354 such that surface 360.4 of piston 360 is in sealing contact with face sealing surface 354.4 of member 354.

During extension of damper 320 at lower stroking velocities, rod 324 moves downward and to the left as viewed in FIG. 6. Hydraulic fluid within rebound volume 326.5 is displaced and moves toward piston 322. If the pressure in the rebound volume 326.5 is sufficiently great, then this pressure acts on the stack of shims 336 that act as a one way valve, deflect the shims, and hydraulic fluid flows through a passageway within piston 322 and into compression volume 326.4.

In addition to this flowpath, the fluid within rebound volume 326.5 being displaced by movement of rod 324 is also able to flow through a plurality of feed apertures 324.4 into a central internal passage 324.1. This fluid can flow through the restriction provided by orifice 354.3 that is provided within member 354. As shown in FIG. 6, hydraulic fluid in this flow-path flows with little or no restriction through a central orifice 360.2 within piston 360. Thus, in comparing valve assemblies 350 and 150, it can be seen that the location of the most restrictive portion of this flow-path is preferably located in first member 354 in valve assembly 350, and in piston 260 of valve assembly 250. However, the present invention also contemplates those embodiments in which this most restrictive portion of the flow-path can be placed in either of the members X54(154, 254, 354, etc.) or piston X60.

FIG. 7 depicts valve assembly 350 of shock absorber 320 at higher stroking velocities. Hydraulic fluid from within compression volume 326.4 is free to flow within the spring pocket of housing 350 by way of a plurality of apertures 352.4 within member 352. These apertures permit pressure of the compression volume 326.4 to be communicated to the underside of piston 360, up to and including a peripheral resilient seal 360.7. Fluid from compression volume 326.4 is also free to flow to the topside of piston 360 by way of a plurality of apertures 354.3. Thus, as shown in FIG. 6, pressures on both sides of piston 360 are the same, although there is a larger surface area on the side of piston 360 that faces compression end 328. Therefore, there is a net pressure force that pushes piston 360 (as viewed in FIG. 6) toward the left. However, this pressure force is counter-balanced by a preload from spring 370 located within its spring pocket.

Referring to FIG. 7, as pressure in the compression volume 326.4 increases (as a result of a higher extension velocity) the difference in area on either side of the piston, co-acting with the higher fluid pressure is sufficient to overcome the preload of the spring and move housing 350 toward the right (as viewed in FIG. 7.) This relative movement between housing 350 and piston 360 opens a second flow-path from central passage 324.1 of rod 324 to the plurality of orifices 354.3 of member 354. This second, high extension velocity flow-path 382 has a higher flow number, and therefore permits a higher flow of fluid for a given pressure differential, in comparison to low speed flow-path 380.

Figure 9:
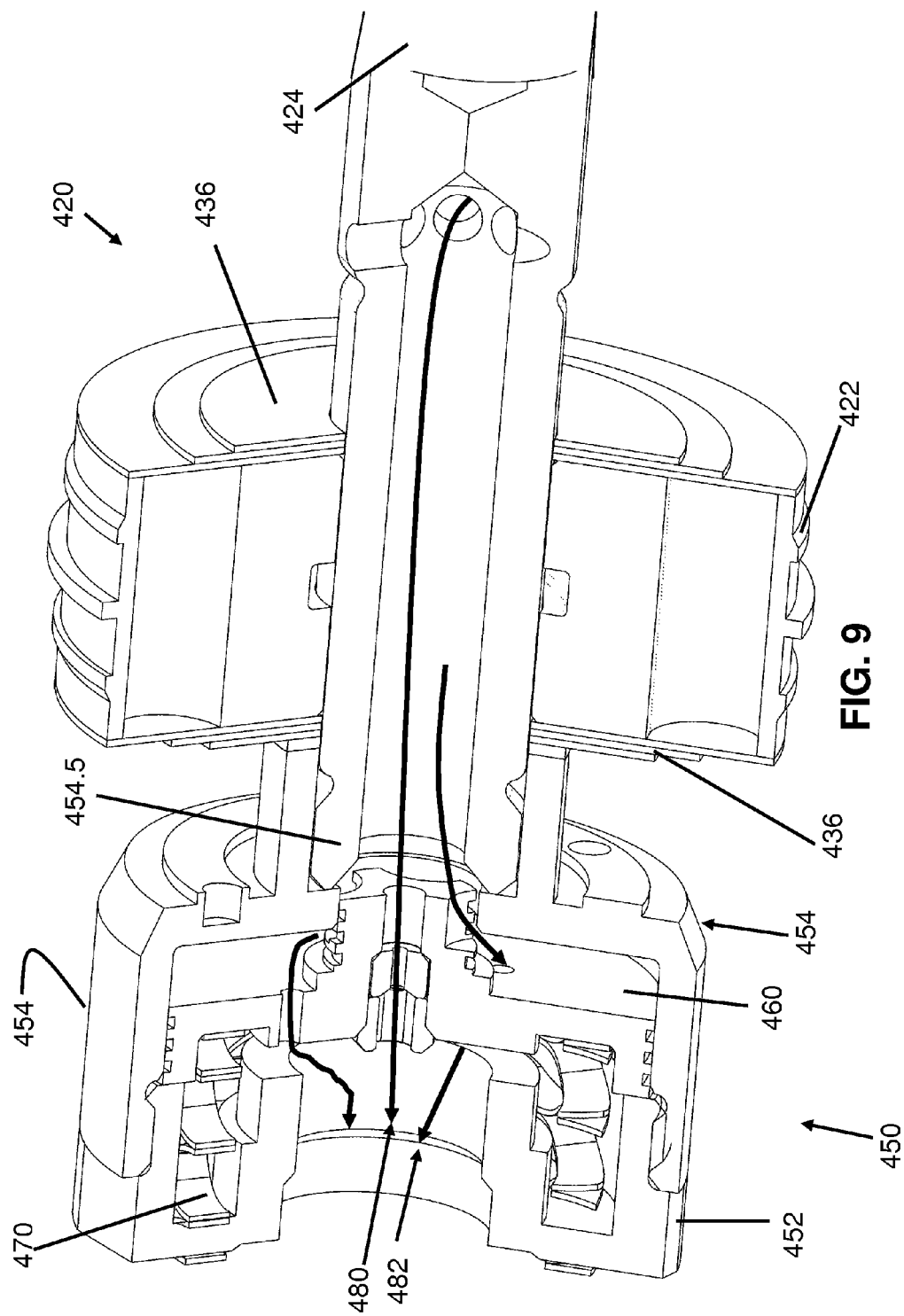
FIG. 9 is a graphical depiction of the characteristics of a shock absorber according to another embodiment of the present invention.

FIG. 9 depicts a portion of a shock absorber 420 having regressive characteristics in extension. Shock absorber 420 includes a rod 420 having a threaded end that is threadably coupled to a member 454 of a valve assembly 450. Valve assembly 450 is similar to valve 150 as shown in FIGS. 2 and 3 except as shown and described hereafter.

In comparing FIGS. 2 and 9, it can be seen that rod 124 is threadably received by housing member 152 of valve assembly 150, whereas valve assembly 450 is threadably received on the other end of the assembly by threads 454.5 of member 454. Note that the relative direction of flow within valves 150 and 450 is the same: fluid flows in the direction from the first member X54 through piston X60 and finally through the second member X52. However, since the valve 450 is oriented as shown in FIG. 9, valve 450 provides regressive flow characteristics in the direction of extension.

Figure 10A:
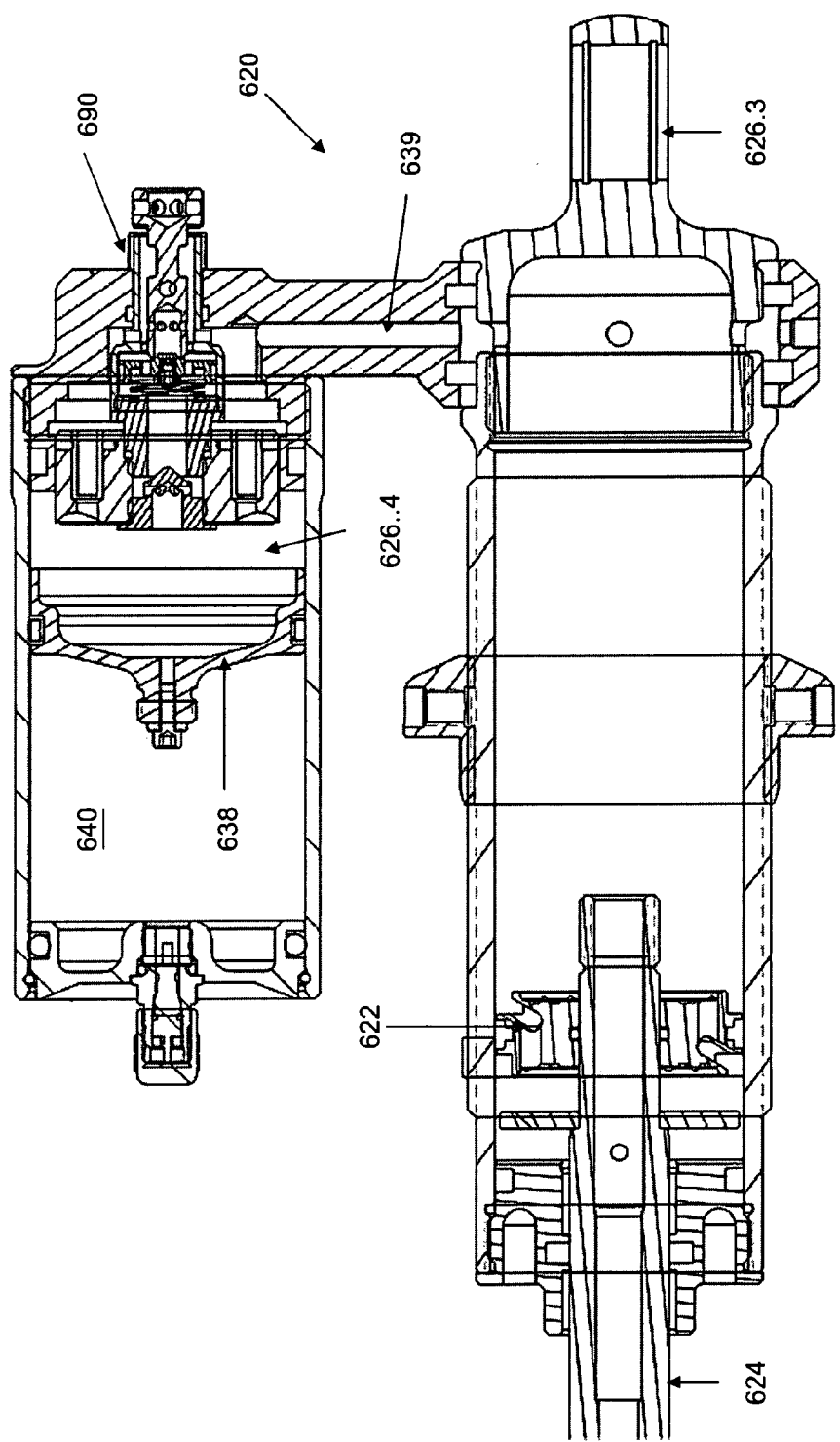
FIG. 10a is a cross-sectional view of a portion of a shock absorber head valve according to another embodiment of the present invention.
Figure 10B:
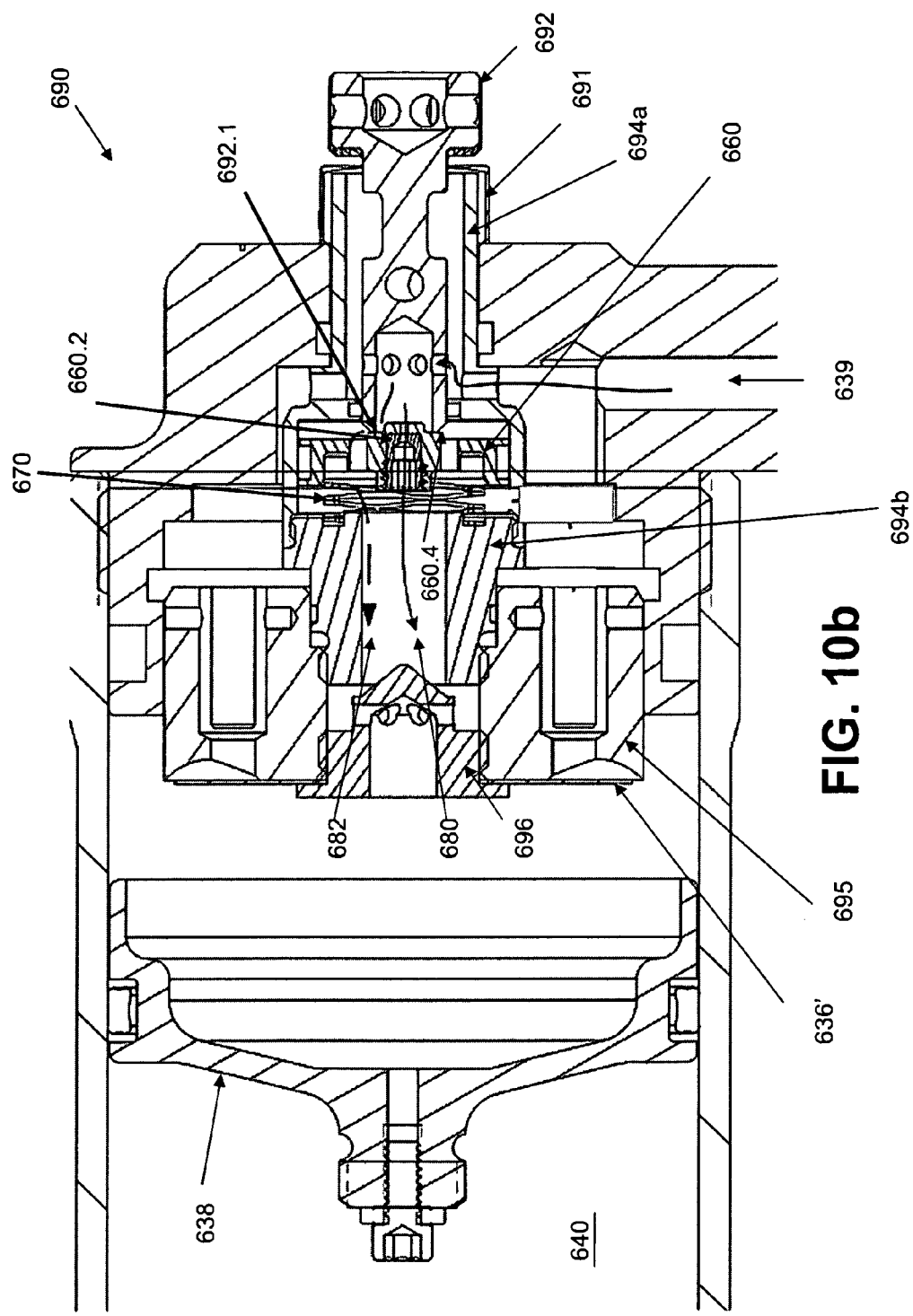

FIGS. 10a and 10b show cross sectional views of an apparatus 620 according to another embodiment of the present invention. FIG. 10a shows a shock absorber 620 having on one end a head valve and reservoir assembly 690 that is in fluid communication by passageway 639 with the compression volume of a shock absorber. Assembly 690 includes an adjustable regressive valve that provides a regressive flowpath into a fluid volume 626.4. That fluid volume is separated by a floating piston 638 from a gas reservoir 640 which preferably contains nitrogen gas under pressure.

FIG. 10b is an enlargement of a portion of the drawing of FIG. 10a. Fluid flowing in through passageway 639 is received within a plurality of circumferential orifices in a first valve member 694a. This flow continues to flow toward the central axis of the regressive valve assembly through a second series of circumferential holes within an inner adjustment member 692. In some embodiments, both adjustment members 694a and 692 can be externally adjusted, as shown in FIG. 10b. Member 692 has on one end (to the rightmost of FIG. 10b) a knob that can be turned by the user. Valve assembly member 694a is coupled to member 691, and provides a gripping means such as a knurled surface for the user to grab and thereby turn valve 694a.

After fluid has flowed through the circumferential apertures of member 694a and adjustment member 692, it is received within an inner flow area where it acts on the center of a slidable piston 660. Piston 660 is slidable within and sealed to the inner diameter of a chamber defined by valve member 694a. A spring 670 is received within a pocket formed on the underside of piston 660. Spring 670 is further biased against a second member 694b that is threadably received by member 694a. Spring 670 is thereby captured within a housing defined by attached members 694a and 694b, and biases piston 660 away from member 694b.

The other, downstream end of member 694b is threadably received within a static member 695. Static member 695 is threadably coupled to the holding structure of head valve assembly 690, and further locates by threads a static flow member 696. One end of flow member 696 includes a conically shaped portion 696.1 that extends into a downstream portion of valve member 694b. As flow from flowpaths 680 and 682 exit member 694, they pass through an annular restriction formed by the conical nose of member 696 and the end of the inner passage of member 694b.

The restriction between the conical portion of member 696 and the exit of member 694b coact to form an adjustable high velocity restriction for the high velocity flowpath 682. As external adjustment member 691 is rotated, valve assembly 694a/694b, which is threadably received within static member 695, moves axially either closer or further from the conical seat of static member 696. With this action, an annular restriction is formed which provides a pressure drop for flowpaths 680 and 682. However, since the magnitude of the high speed flow 682 is generally greater than the flow along path 680, adjustment of the restriction formed by the conical member tends to be more restrictive under high stroking velocity operation.

Head valve 690 further includes means for adjusting the preload on the spring, and in this way provides an adjustment that modifies the force at which the low speed portion of the regressive curve ends and the intermediate velocity portion (the portion transitioning to the high velocity regime) begins. Referring to FIG. 10b, adjustment member 692a is threadably received within housing 694a (details of which can be seen in FIG. 17, which is a more detailed view of the apparatus of 10b with regards to this aspect). Rotation of adjustment member 692 thereby moves member 692 axially left and right, as viewed on FIG. 10b. Adjustment member 692 on its interiormost end 692.1 abuts against a face sealing surface 660.4 of piston 660. By moving member 692 left, the preload on spring 670 is increased. By moving member 692 to the right, the preload member on spring 670 is decreased.

Piston 660 includes a central orifice 660.2 that provides most of the low velocity restriction of head valve 690. The low speed flowpath 680 (through central orifice 660.2) and the high velocity flowpath 682 (around the face seal formed by surfaces 660.4 and 692.1 during high velocity operation) are both provided fluid from pathway 639. However, fluid from passage 639 is further in communication with an annular passage within static valve 695 (and further evident in FIG. 16). Fluid within this annular passage, once it reaches sufficiently high pressure, can blow off past the shim 636, and therefore forms a flowpath parallel with flowpaths 682 and 680 into volume 626.4.

Figure 12:
FIG. 12 is a graphical depiction of the characteristics of a shock absorber having adjustable regressive characteristics in rebound according to another embodiment of the present invention.
Figure 13:
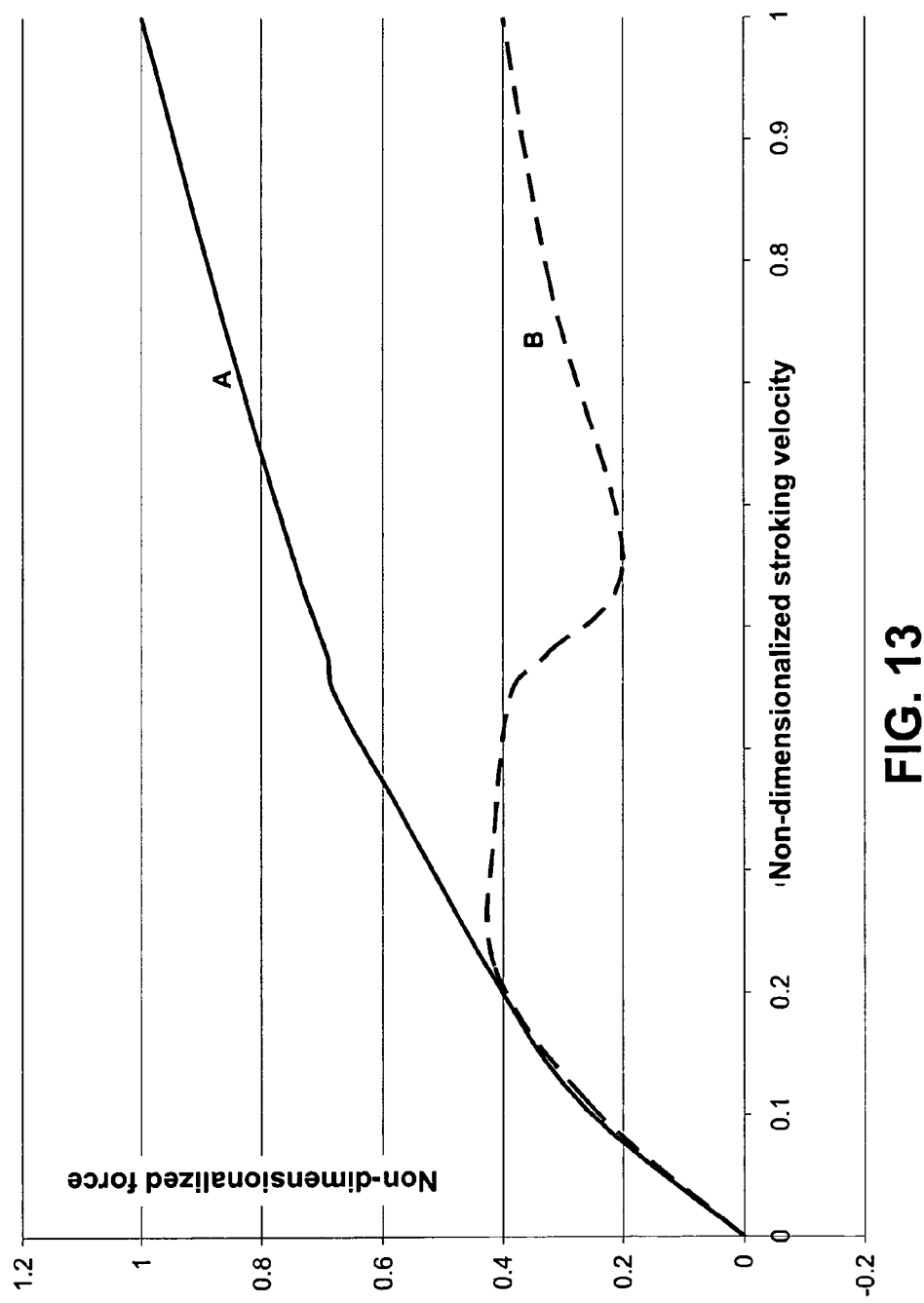
FIG. 13 is a graphical depiction of the characteristics of a shock absorber having adjustable regressive characteristics in rebound according to another embodiment of the present invention.
Figure 15:
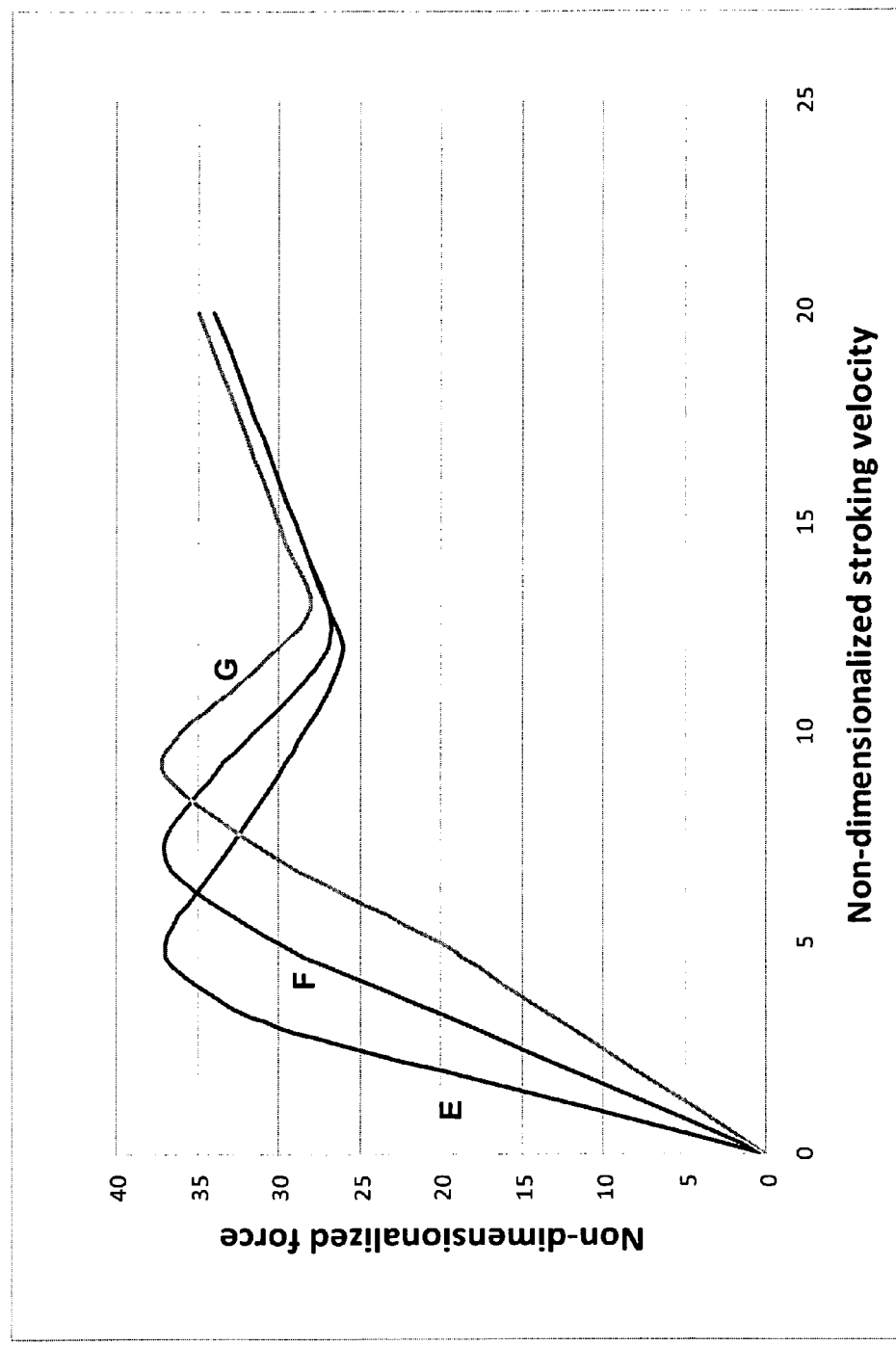
FIG. 15 is a graphical depiction of the characteristics of a shock absorber having adjustable regressive characteristics in rebound according to another embodiment of the present invention.

FIGS. 12, 13, and 15 are graphical representations of the adjustments that can be made to a shock absorber having regressive characteristics according to various embodiments of the present invention. Although FIGS. 12, 13, and 15, show regressive characteristics in compression, it is understood that the various adjustments and their subsequent modifications to the regressive characteristic can also be adapted to a shock absorber having regressive characteristics in the extension direction.

FIG. 12 shows the effect of altering the preload of the spring X70 (i.e., 170, 270, 370, 470, 570, and 670). Plot C shows a regressive characteristic with a relatively high spring preload. Graph D shows a regressive characteristic with a relatively low spring preload. The effect of changing the spring preload has little or no effect at low stroking velocities (such as below 0.06). Further, there is relatively little effect at higher stroking velocities, such as from 0.7 to 1.0. The most notable effect on spring load of varying spring preload is in the poppet force that establishes the end of the low speed regime. For both characteristics C and D, the poppet force occurs at a velocity of approximately 0.1. From this low poppet velocity to the high speed characteristic at about 0.7, the piston X60 is moving from its first, spring-preloaded position to its second position. In this intermediate speed regime the low speed flowpath X80 is open, but the second, high speed flowpath X82 is at a position between fully closed and fully open.

FIG. 13 graphically shows the effect of altering the high velocity flow characteristics of the valve assembly. Both graphs A and B have the same spring preload, and each lifts of at a velocity of about 0.2. Referring to graph B, the second, high speed flowpath X82 moves from its first, fully closed position to a fully open position in an intermediate velocity range from about 0.2 to about 0.50. From a velocity of about 0.55 to 1, the second, high speed flowpath is fully open. Likewise for graph A, the high speed flowpath is fully open from a velocity of about 0.50 to about 1. However, in the case of a valve assembly adjusted to the schedule of graph A, the high speed forcing characteristic at a velocity of 1 is more than doubled relative to graph B. Indeed, the high speed adjustment of graph A results in a high speed flowpath that is so restrictive that the low and intermediate velocity regimes are dominated by the low speed flowpath X80.

FIG. 15 shows the effect of adjusting the characteristics of the low speed region. In each of graphs E, F, and G, there is the same high speed flow characteristic (beginning at a velocity of about 13) as well as the same spring preload. It can be seen that adjusting the flow characteristics of the most restrictive orifice of the low speed flowpath (whether the orifice is located in the inner piston or a housing member) moves the velocity at which the poppet moves off of its preloaded face sealing contact from a velocity of about 5 (for graph E) to about 10 (for graph G). However, the force at blow off remains at about 37 in each of these three examples. It can also be seen that each of the three graphs show substantially similar high speed characteristics.

Figure 14:
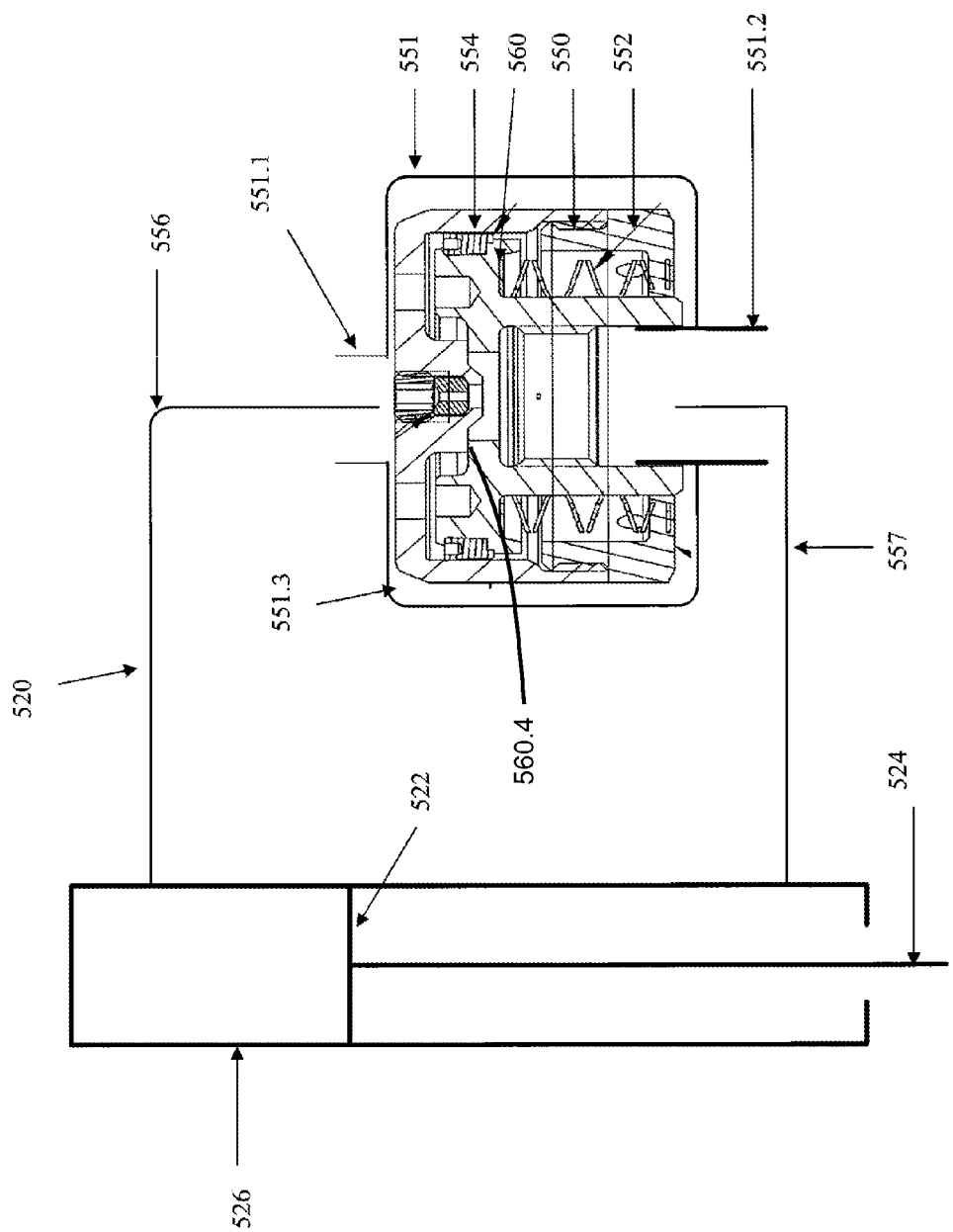
FIG. 14 is a schematic representation of a shock absorber utilizing the apparatus of FIG. 8 according to another embodiment of the present invention.

FIG. 14 is a schematic and cross sectional representation of an apparatus according to another embodiment of the present invention. FIG. 14 shows a shock absorber 520 including an external valve assembly that provides a regressive forcing function. Shock absorber 520 includes an external valve assembly 551 that has a first fluid inlet port 551.1 in fluid communication through passageway 556 with the compression volume 526.4 of a cylinder 526. The other end of housing 551 has a fluid port 551.2 in fluid connection via passage 557 with the rebound volume 526.5 of cylinder 526. A piston 522 divides the compression and rebound volumes.

Located within external housing 551 is a valve assembly 550 that is substantially the same as valve assembly 350 of FIG. 8, except as shown and described hereafter. Valve assembly 550 is threadably coupled at one end to outlet port 551.2, thus fixing the position of valve assembly 550 within the interior volume 551.3 of housing 551. Fluid received within port 551.1 is presented to one side of piston 560 by a plurality of apertures 554.6, as is also the case in valve 350. Further, fluid from port 551.1 is further in communication with the central orifice 554.3, and is able to flow through that orifice into the outlet 551.2.

As is the case with valve assembly 350, when pressure on piston 550 is sufficiently high to overcome the preload force exerted by spring 570, fluid is free to flow through flowpath 582 around the face seal 560.4 between piston 560 and member 554. This second flowpath 582 is in parallel with the first flowpath 580, which is also the case in valve assembly 350.

As can be understood from the drawings and description given herein, shock absorber 520 can have either regressive characteristics in compression or extension based on the orientation of head valve 551. In the orientation as shown in FIG. 14, shock absorber 520 has a regressive forcing characteristic in a compression direction. However, by reorienting external valve assembly 551 such that port 551.1 is in fluid communication with pathway 557 and port 551.2 is in fluid communication with pathway 556, shock absorber 520 has a regressive characteristic in extension. Further, the current invention contemplates those embodiments having first and second external valve assemblies 551, each with an orientation opposite the other such that the resulting shock absorber characteristics are regressive in both extension and compression.

Figure 16:
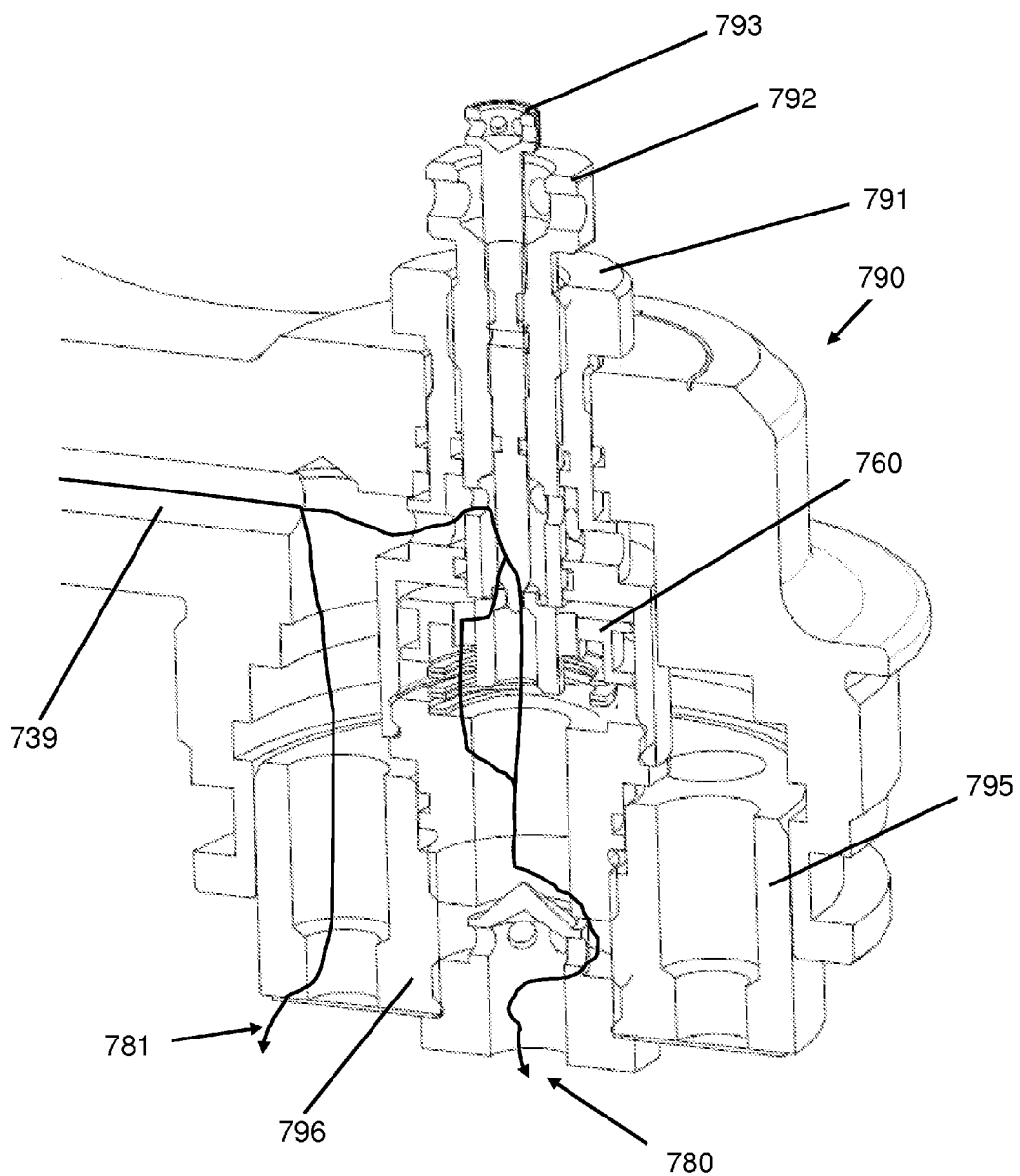
FIG. 16 is a cutaway, perspective view of an apparatus according to another embodiment of the present invention.
Figure 17:
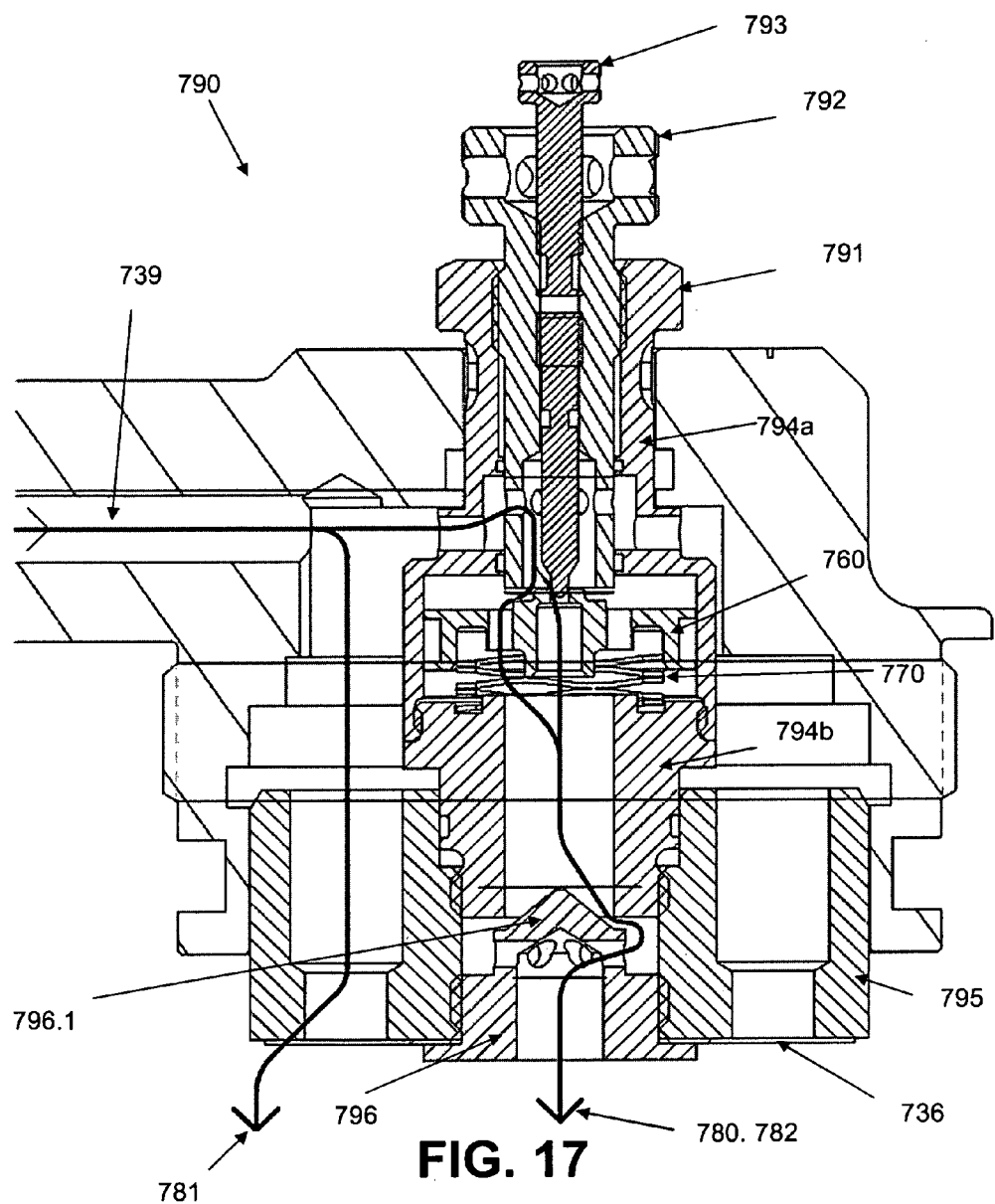
FIG. 17 is a cross sectional orthogonal view of the apparatus of FIG. 16.

FIGS. 16 and 17 depict an apparatus 790 according to another embodiment of the present invention. Head valve assembly 790 is similar to head valve 690, except as shown and discussed hereafter. Head valve 790 includes a third means for adjusting the regressive flow characteristics of valve assembly 790. Head valve 790 includes a third means 793 for adjusting the low velocity regressive characteristics of a shock absorber. A shaft 793 includes an external feature (at the top of page 17) by which a user can grip and turn shaft 793. Shaft 790 is threadably received within the inner diameter of adjustment collar 792. Further, shaft 793 includes a sealing groove and seal (not shown) for discouraging leakage flow between shaft 793 and collar 792.

At the innermost end of shaft 793 there is a bull nose projection that is received within a central aperture of piston 760. An annular restriction is formed between the bull nose projection and the central aperture. Fluid from passageway 739 flows through this annular restriction as the low velocity flowpath 780. By rotating shaft 793 relative to collar 792, the bull nose projection is moved axially within the central aperture of piston 760. Since the outer surface of the bull nose projection is contoured, moving the projection upward (referring to FIG. 17) increases the area of the annular flowpath and thereby decreases the restrictiveness of flowpath 780.

In one embodiment, the high velocity regressive adjustment of member 794b relative to conical projection 796.1 includes positive means for establishing the relative rotational positions of member 794b and the static structure of head valve 790, such as a detent mechanism. As shown in FIG. 17, outer adjustment member 791 is integral with member 794a.

Preferably, there is a detent mechanism or other method of positively establishing the relative rotational positions of adjustment collar 792 and member 794a, such as a detent mechanism. Further, in some embodiments, there is a detent mechanism establishing positively the relative rotational positions of shaft 793 and collar 792.

Although what has been shown and described in FIGS. 16 and 17 are three adjustments features 791, 792, and 793 that act on a head valve 790, the invention is not so limited. Other embodiments of the present invention contemplate adjustments of the regressive characteristics that can be made for valve assemblies X50 located on either rod X24 or piston X22. As one example, and referring to FIGS. 2 and 3, the present invention contemplates those embodiments in which one, two or three adjustments are located within the rod and extend through the main piston to the regressive valve assembly.

Further, although some embodiments such as valve assembly 150 are shown attached to the end of rod 124, the present invention also contemplates those embodiments in which the valve assembly X50 is attached to piston X22.

While the inventions have been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A hydraulic damper, comprising:
a first housing defining a cavity for hydraulic fluid;
a first piston slidable within the cavity and dividing the cavity into a first volume and a second volume;
a rod extending from the cavity, said first piston being attached to said rod, said rod including an internal passageway for flow of hydraulic fluid between said first volume and said second volume;
a second housing in fluid communication with the first volume and fixedly attached to said rod, said second housing including an internal chamber and a second piston slidable within the chamber between a first position and a second position; and
a spring for biasing said second piston to the first position;
wherein in the first position there is a first flow path for the flow of hydraulic fluid from the first volume through the internal passageway and into the second volume, in the second position there is a second flow path for the flow of hydraulic fluid from the first volume through the internal passageway and into the second volume, and the first flow path is more restrictive than the second flow path;
wherein said second piston is actuated to the second position by hydraulic pressure when pressure in the first volume is higher by a predetermined amount than pressure in the second volume;
wherein the second piston has a surface area, and in the first position a first portion of the surface area is exposed to pressure from the first volume and the remainder of the surface area is not exposed to pressure from the first volume, the first portion coacting with pressure from the first volume to move said second piston toward the second position, and wherein in the second position pressure from the first volume coacts with the first portion and the remainder of the surface area to maintain said second piston in the second position;
wherein said second piston includes a flow orifice located within the remainder of the surface area for flow of hydraulic fluid from the first volume into the second volume.

2. The damper of claim 1 wherein said second piston includes a first aperture in the first flow path and the second flow path, said second piston includes a second aperture in the second flow path, and in the first position hydraulic fluid flows through the first aperture and the second aperture is substantially blocked off, and in the second position hydraulic fluid flows through the first aperture and the second aperture.

3. The damper of claim 1 wherein said first piston includes a third flow path for the flow of hydraulic fluid from the first volume to the second volume.

4. The damper of claim 1 wherein said damper provides a damping force that opposes compression and rebound, and said second piston moves to the second position during rebound.

5. The damper of claim 1 wherein said damper provides a damping force that opposes compression and rebound, and said second piston moves to the second position during compression.

6. The damper of claim 1 wherein said damper provides a damping force that opposes compression and rebound, and the second flow path is not operable during rebound, and the first flowpath is operable during compression and rebound.

7. The damper of claim 1 wherein said damper provides a damping force that opposes compression and rebound, and the second flow path is not operable during compression, and the first flowpath is operable during compression and rebound.

8. The damper of claim 1 wherein the predetermined amount is a first predetermined amount, and said second piston moves from the second position to the first position after hydraulic pressure falls below a second predetermined amount that is less than the first predetermined amount.

9. The damper of claim 1 wherein the first flow path and the second flow path operate in parallel when said second piston is in the second position.

10. The damper of claim 1 wherein the first flow path is in parallel with a third flowpath through said first piston that includes a one-way valve.

11. The damper of claim 1 wherein the second flow path is in parallel with a third flowpath through said first piston that includes a one-way valve.

12. The damper of claim 5 wherein the second flow path is in parallel with a third flowpath through said first piston that includes a one-way valve.

13. The damper of claim 1 wherein said damper provides a damping force that opposes compression, and said second piston is in the first position or second position during compression.

14. The damper of claim 1 wherein pressure in the first volume being higher than pressure in the second volume corresponds to compression of the damper.

15. The damper of claim 1 wherein said second piston is in the first position when pressure in the first volume is higher than pressure in the second volume, and the pressure differential across said second piston is less than the predetermined amount.

16. The damper of claim 1 wherein said second piston has an undersurface, and in the first position hydraulic pressure acting on the remainder of the surface area is the same as hydraulic pressure acting on the undersurface.

* * * * *